United States Patent
Mimura

(10) Patent No.: US 10,317,754 B2
(45) Date of Patent: Jun. 11, 2019

(54) LIQUID CRYSTAL DISPLAY DEVICE

(71) Applicant: Panasonic Liquid Crystal Display Co., Ltd., Himeji-shi, Hyogo (JP)

(72) Inventor: Koji Mimura, Kanagawa (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 15/824,737

(22) Filed: Nov. 28, 2017

(65) Prior Publication Data

US 2018/0081246 A1    Mar. 22, 2018

Related U.S. Application Data

(63) Continuation of application No. PCT/JP2016/001068, filed on Feb. 26, 2016.

(30) Foreign Application Priority Data

May 29, 2015 (JP) .................. 2015-110550

(51) Int. Cl.
*G02F 1/137* (2006.01)
*G02F 1/1343* (2006.01)

(52) U.S. Cl.
CPC .. *G02F 1/134363* (2013.01); *G02F 1/134309* (2013.01); *G02F 2001/13712* (2013.01); *G02F 2001/134318* (2013.01); *G02F 2001/134372* (2013.01)

(58) Field of Classification Search
CPC ......... G02F 1/134363; G02F 1/134309; G02F 2001/134318
See application file for complete search history.

(56) References Cited

U.S. PATENT DOCUMENTS

| | | | |
|---|---|---|---|
| 6,469,765 B1 | 10/2002 | Matsuyama et al. | |
| 2003/0107694 A1* | 6/2003 | Song | G02F 1/133753 349/129 |
| 2008/0180622 A1 | 7/2008 | Horiguchi et al. | |
| 2009/0046232 A1 | 2/2009 | Matsuyama et al. | |
| 2011/0051064 A1 | 3/2011 | Matsumori | |
| 2011/0134345 A1 | 6/2011 | Yamazaki | |
| 2011/0222009 A1* | 9/2011 | Itou | G02F 1/134363 349/139 |

(Continued)

FOREIGN PATENT DOCUMENTS

| | | |
|---|---|---|
| JP | 2000-356786 | 12/2000 |
| JP | 2008-180928 | 8/2008 |

(Continued)

*Primary Examiner* — Lucy P Chien
(74) *Attorney, Agent, or Firm* — Hamre, Schumann, Mueller & Larson, P.C.

(57) ABSTRACT

A liquid crystal display device including a first substrate including a first display electrode and a second display electrode that is disposed opposite the first display electrode with an insulator interposed between the first display electrode and the second display electrode, a second substrate disposed opposite the first substrate; and a liquid crystal layer disposed between the first substrate and the second substrate. The first display electrode includes a plurality of first openings in each pixel, and an interior angle of at least one apex constituting the first opening is different from interior angles of another apex in each of the plurality of first openings.

20 Claims, 45 Drawing Sheets

(56) References Cited

U.S. PATENT DOCUMENTS

| | | | |
|---|---|---|---|
| 2012/0133865 A1* | 5/2012 | Yonemura | G02F 1/133512 349/96 |
| 2012/0162589 A1* | 6/2012 | Yoso | G02F 1/134363 349/126 |
| 2014/0118639 A1 | 5/2014 | Matsushima | |
| 2015/0062522 A1* | 3/2015 | You | G02F 1/134363 349/143 |
| 2015/0160520 A1 | 6/2015 | Matsushima | |
| 2015/0177571 A1 | 6/2015 | Yoshida | |
| 2015/0185578 A1 | 7/2015 | Hirosawa | |
| 2015/0372016 A1 | 12/2015 | Cheng | |
| 2016/0306231 A1 | 10/2016 | Yoso | |

FOREIGN PATENT DOCUMENTS

| | | |
|---|---|---|
| JP | 2009-069816 | 4/2009 |
| JP | 2009-181092 | 8/2009 |
| JP | 2011-186406 | 9/2011 |

* cited by examiner

FIG.3
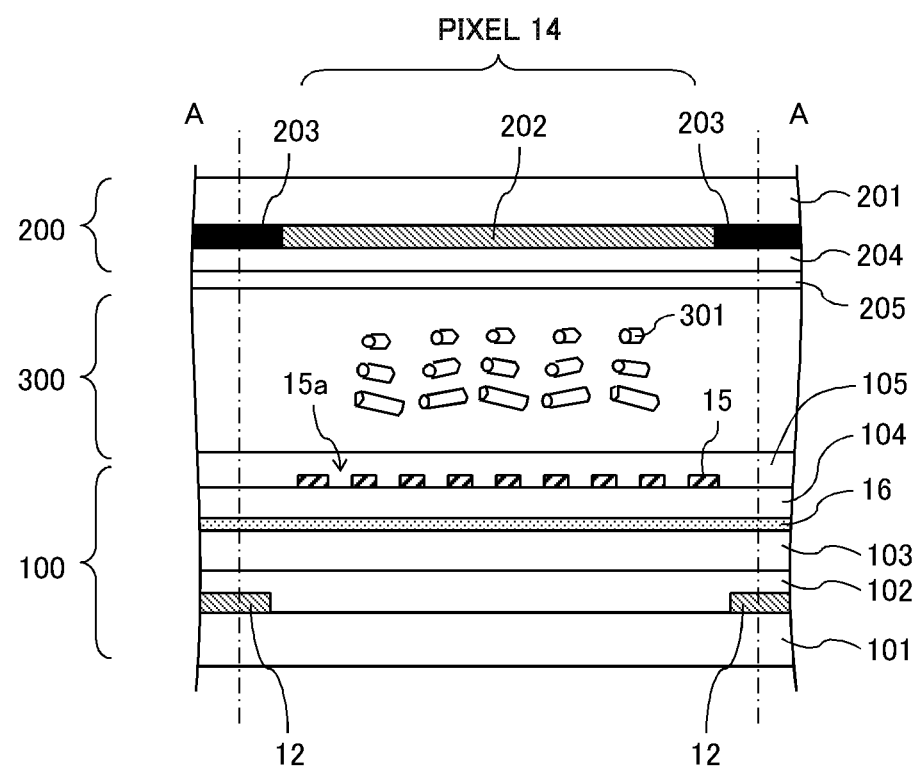
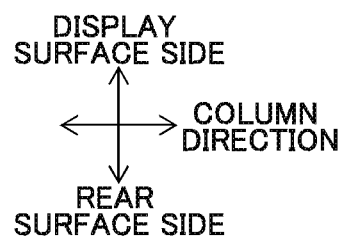

FIG.4
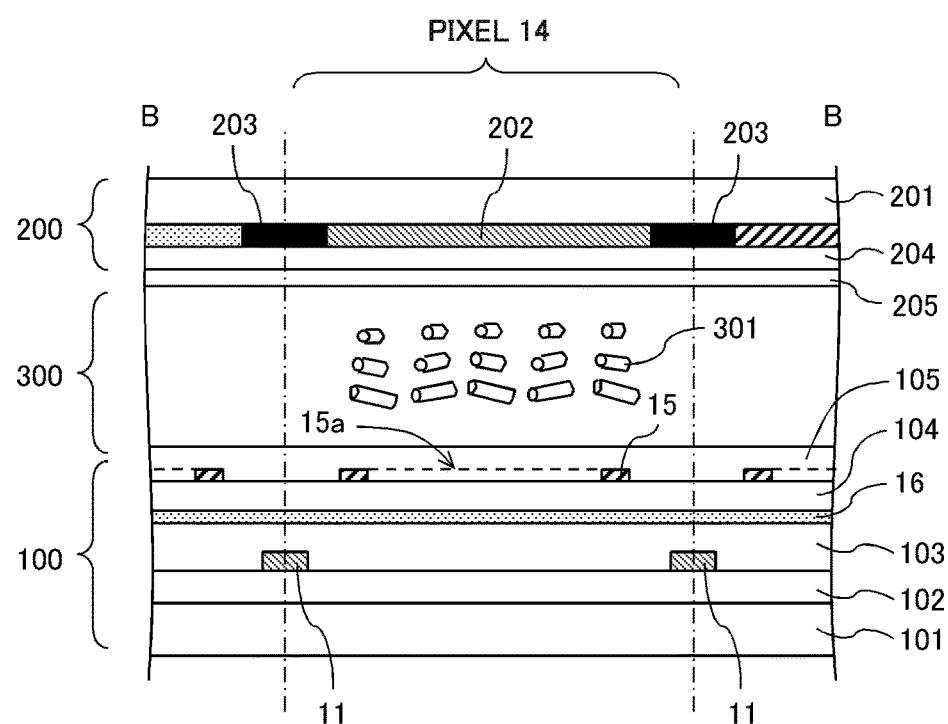
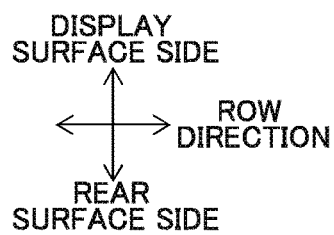

FIG.5
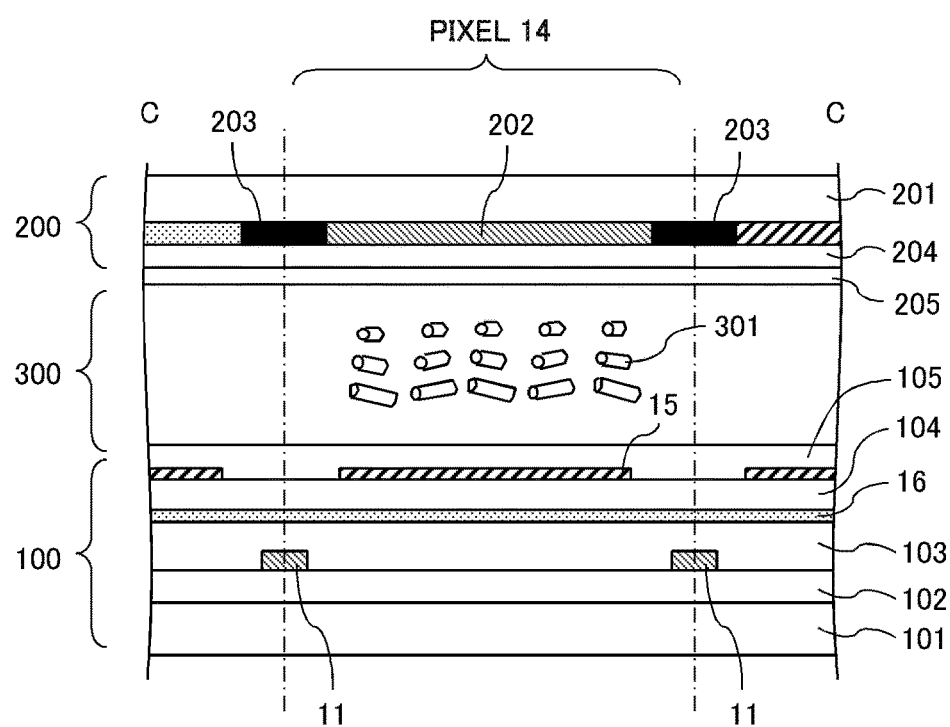
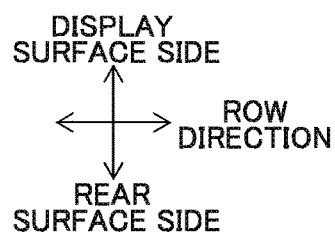

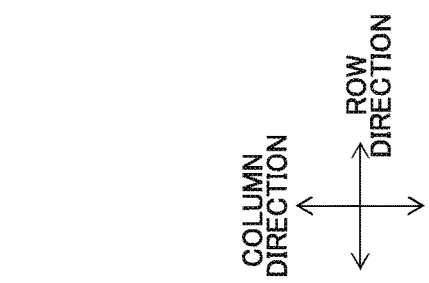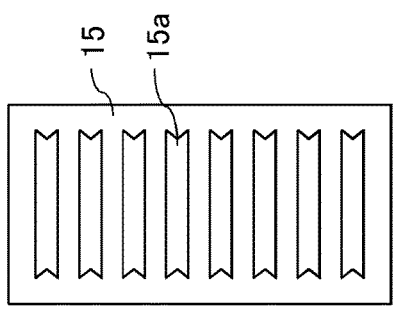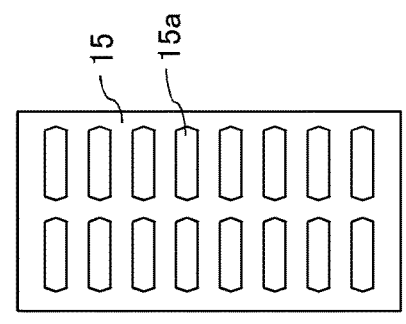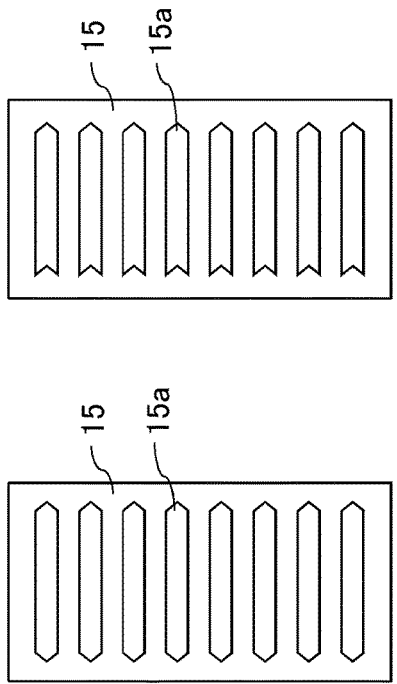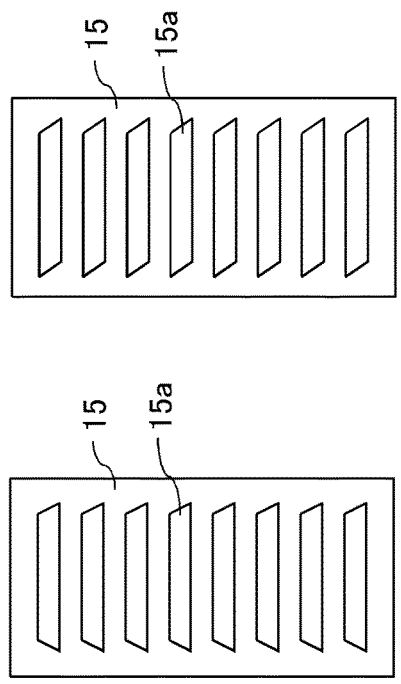

FIG.9
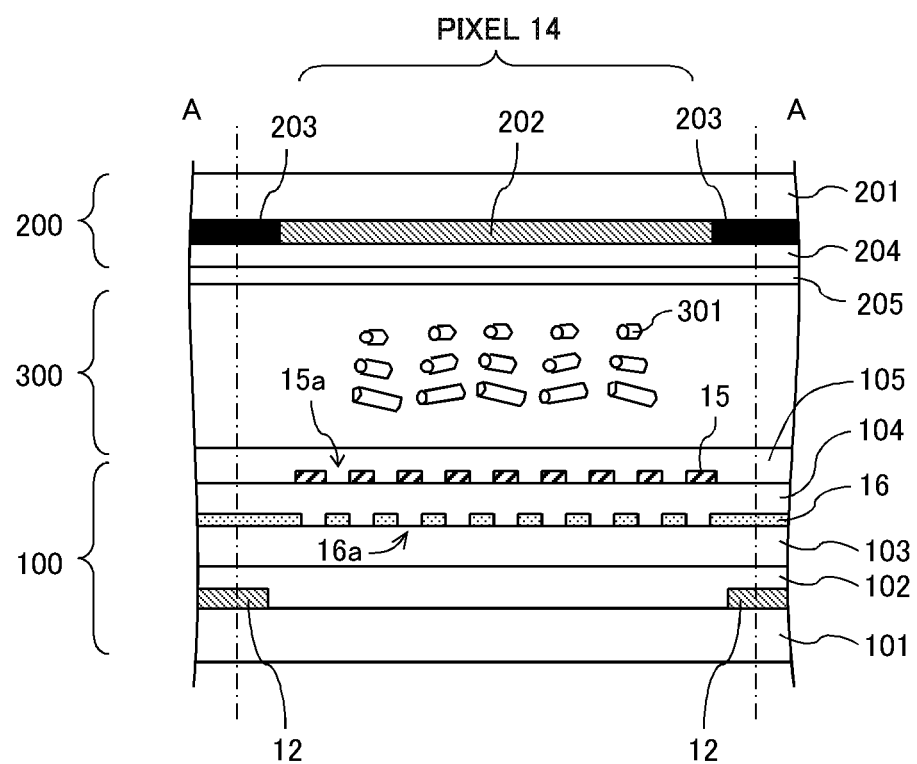
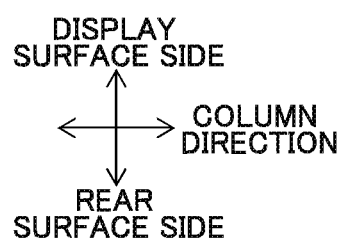

FIG.10
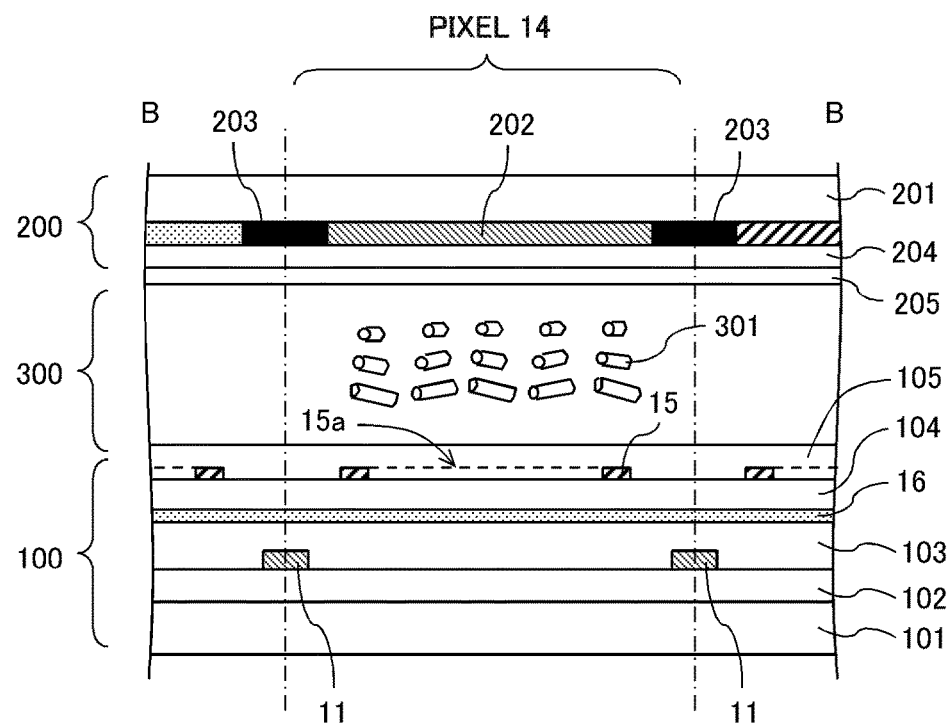
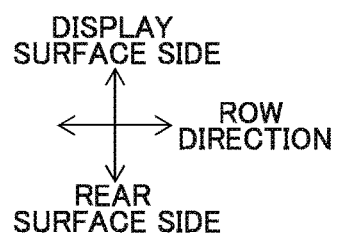

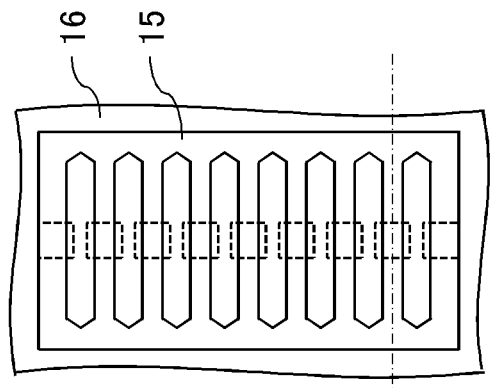
FIG. 13C
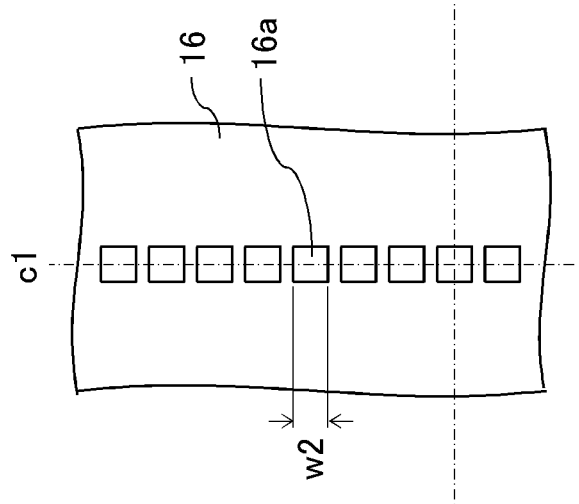
FIG. 13B
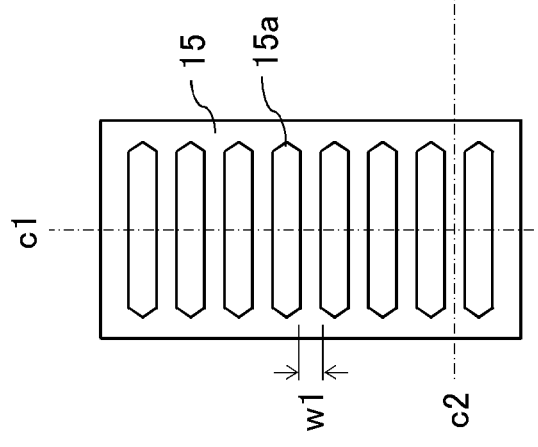
FIG. 13A
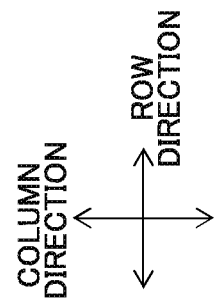

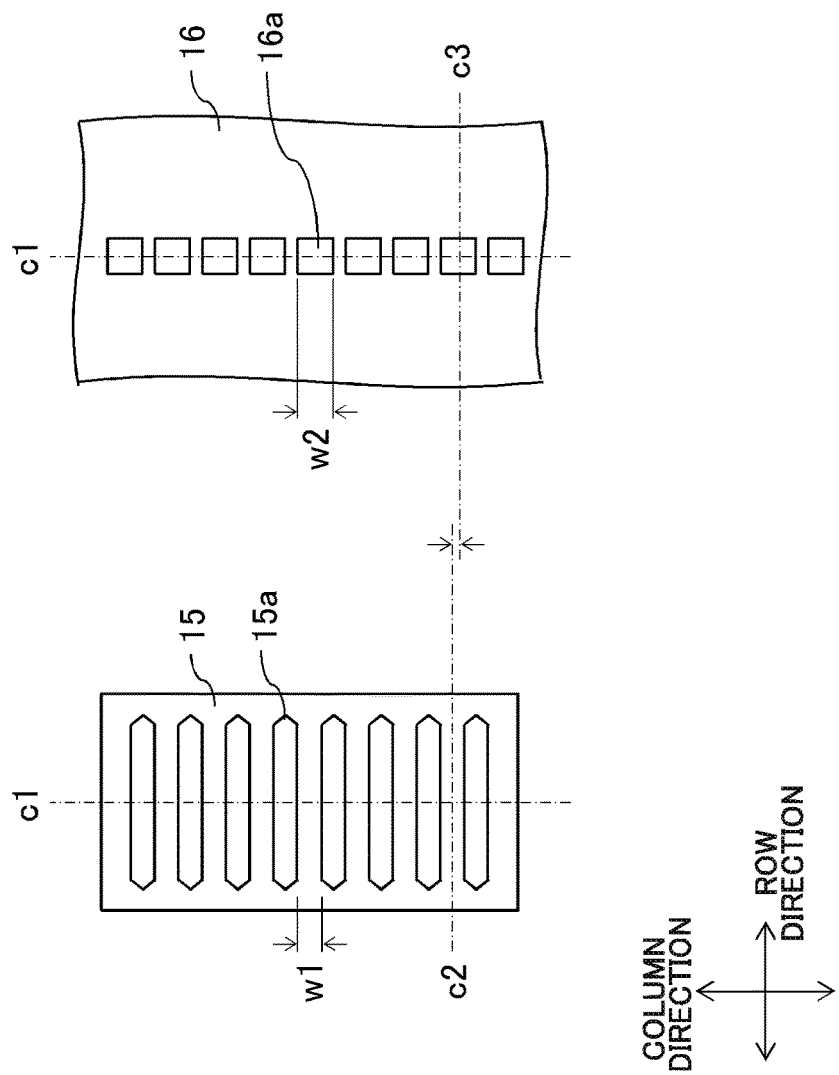

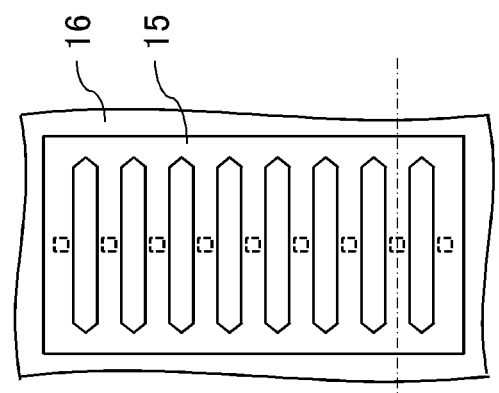
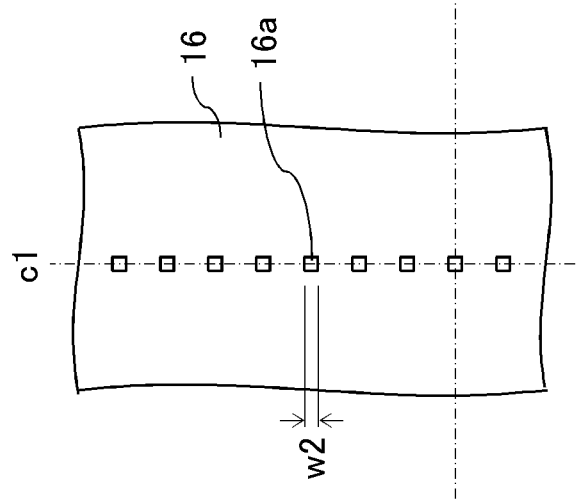
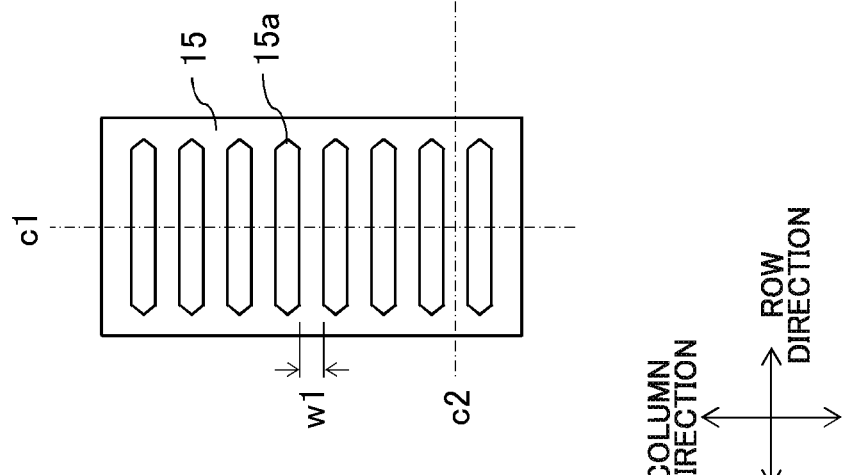

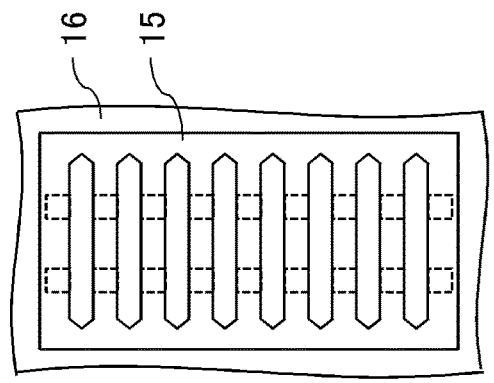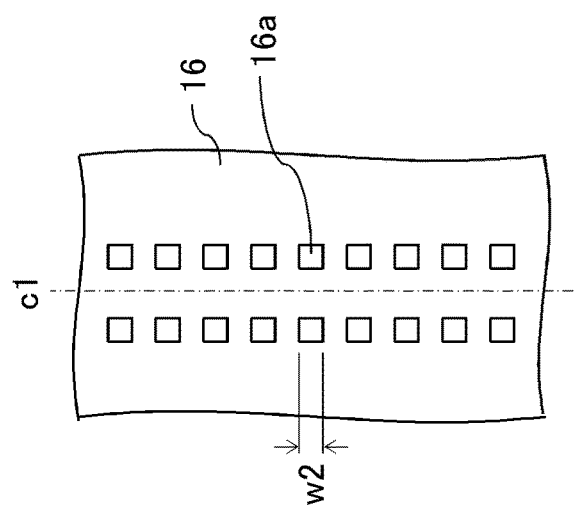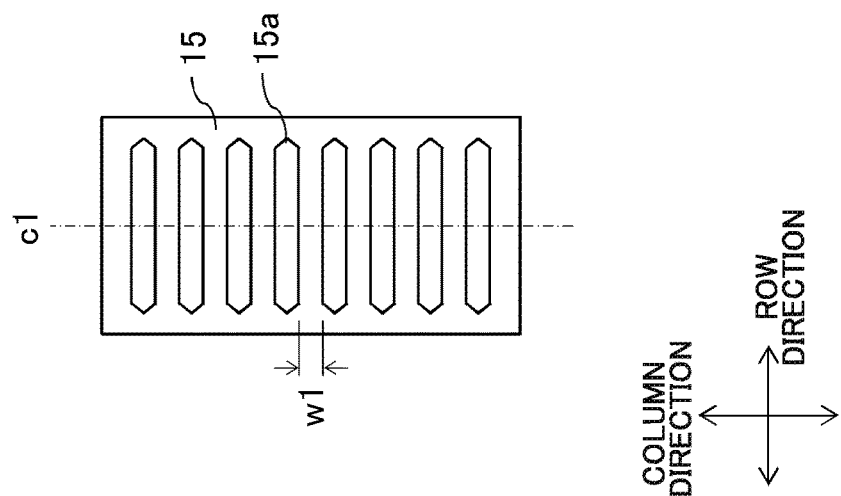

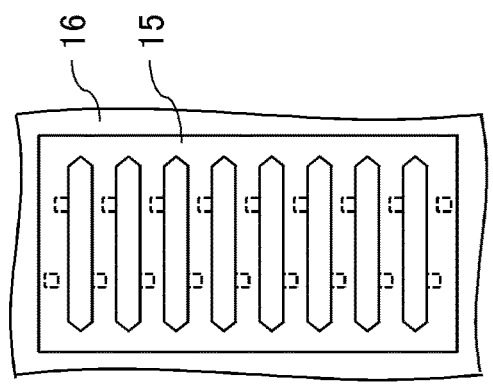
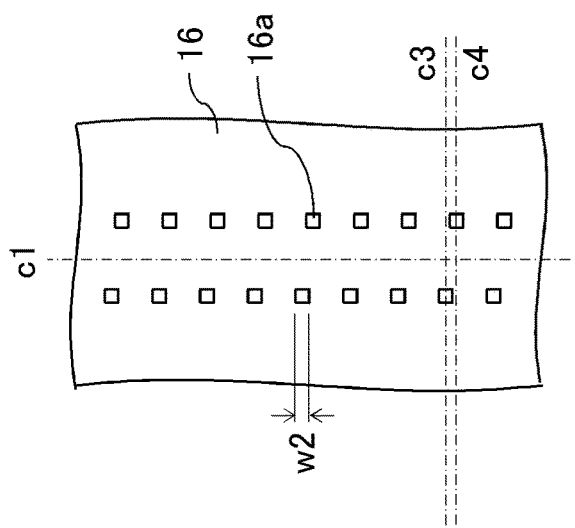
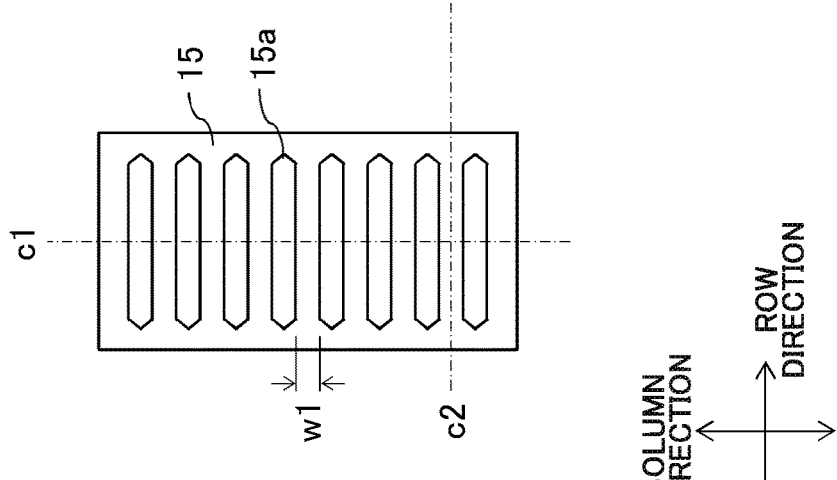

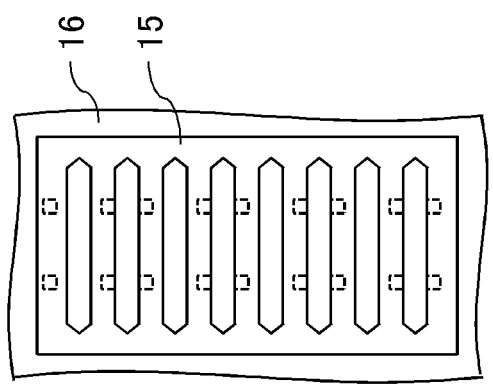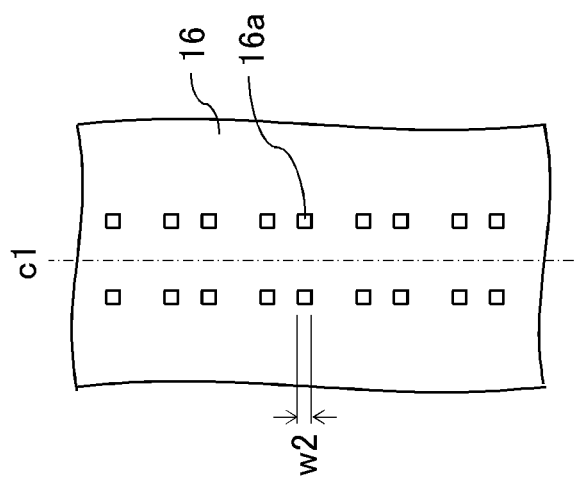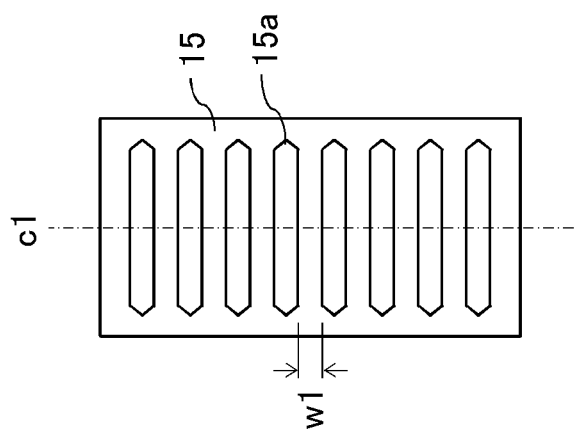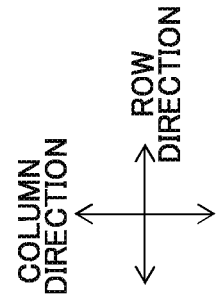

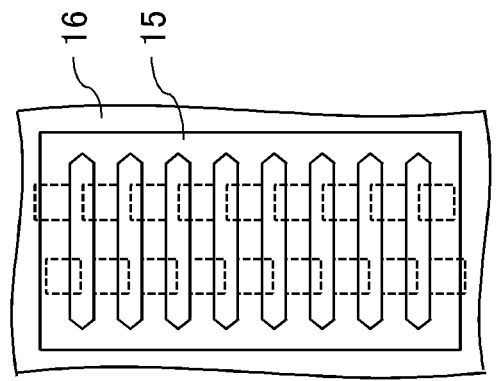
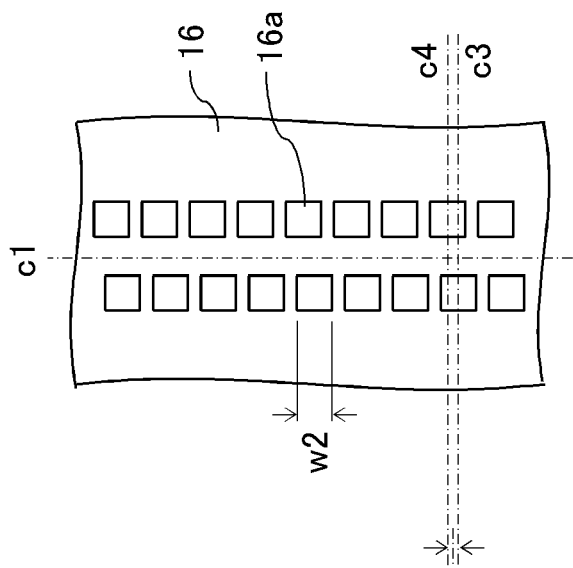
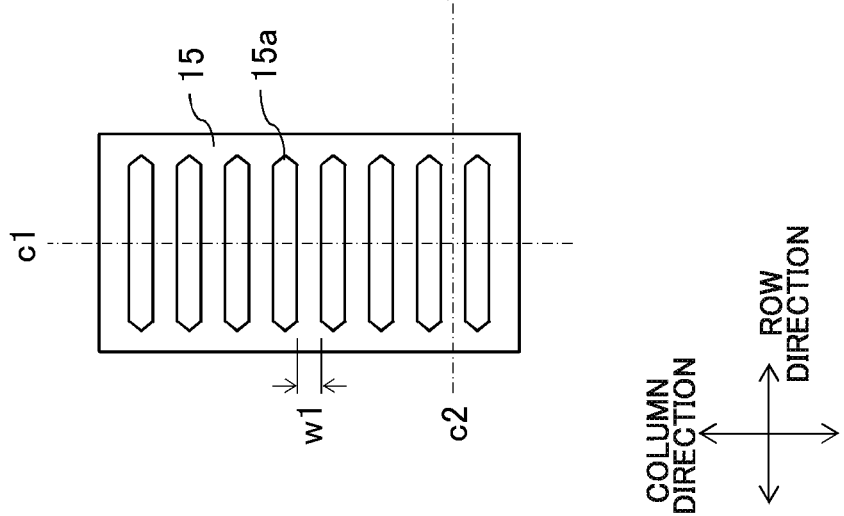

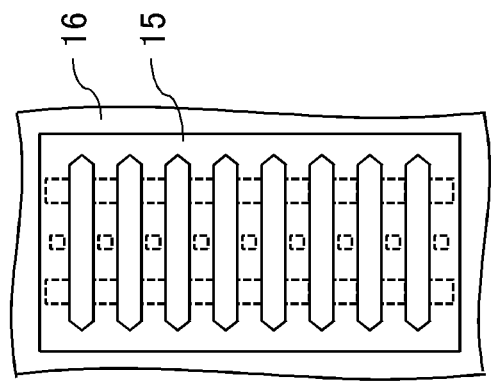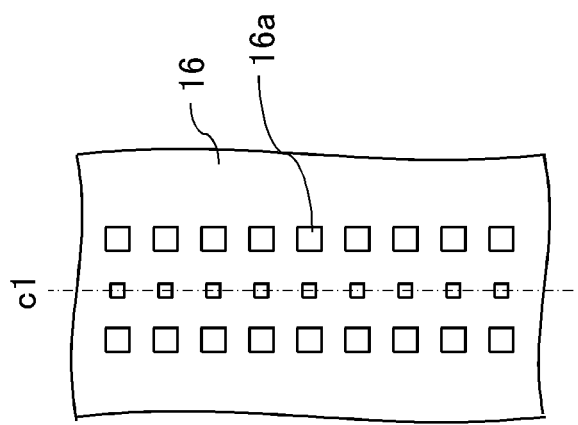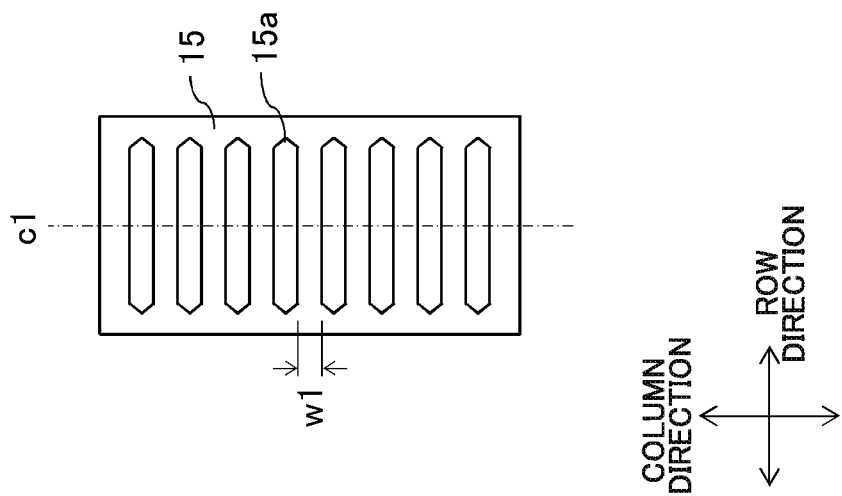

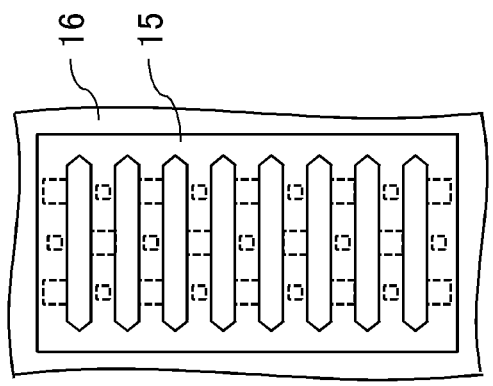
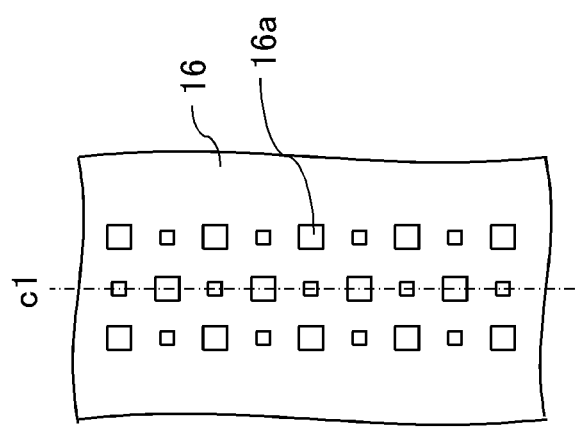
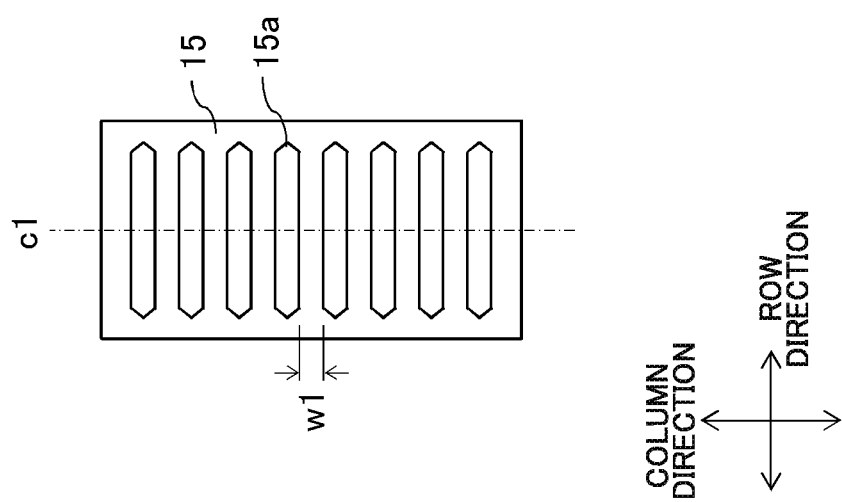

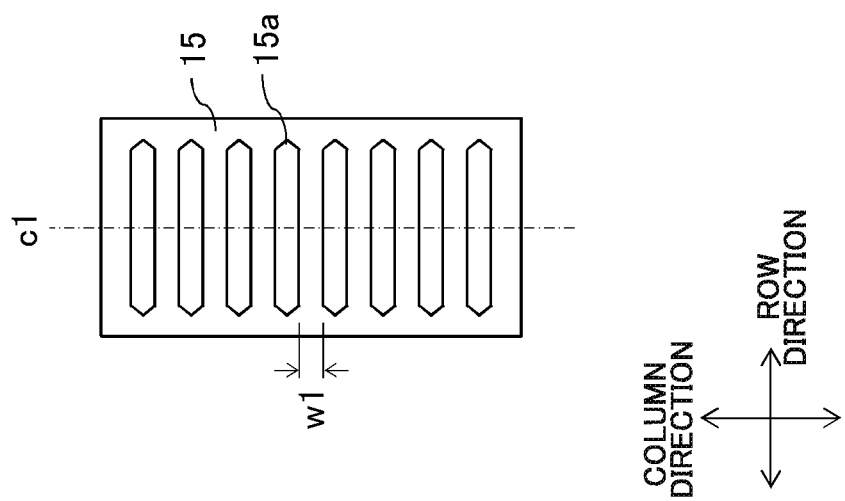
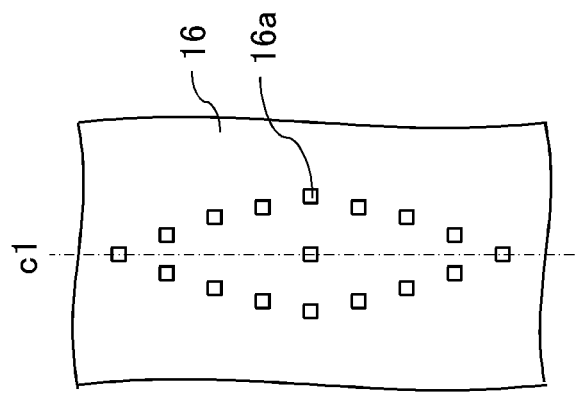
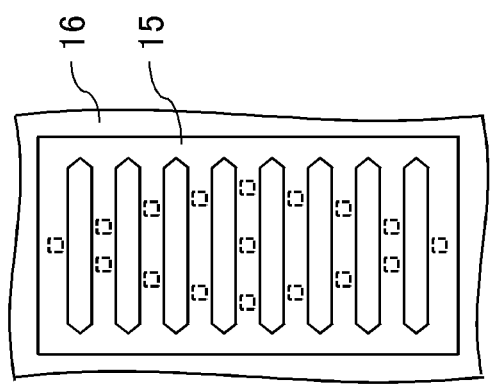

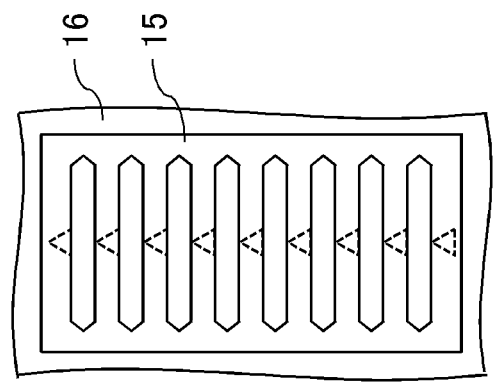
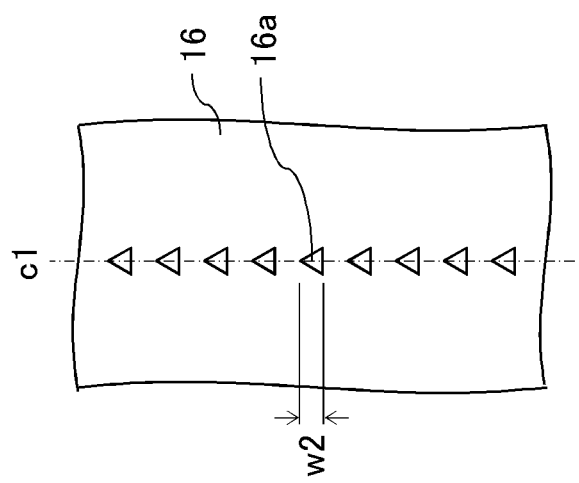
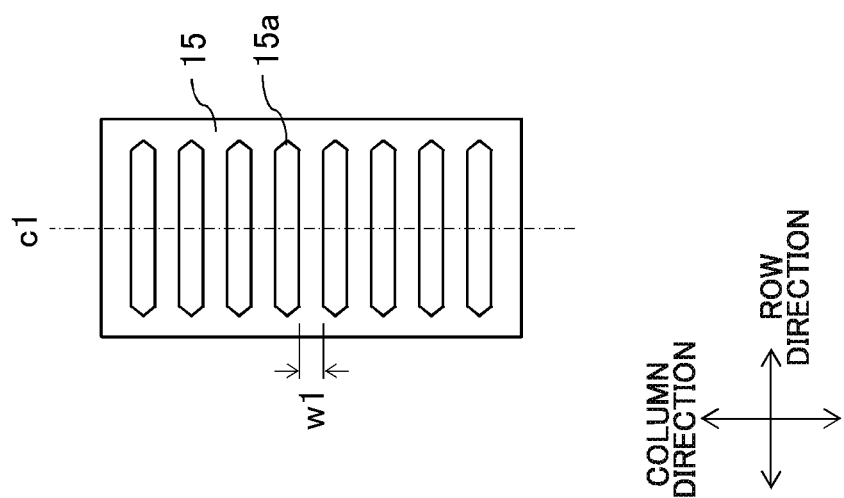

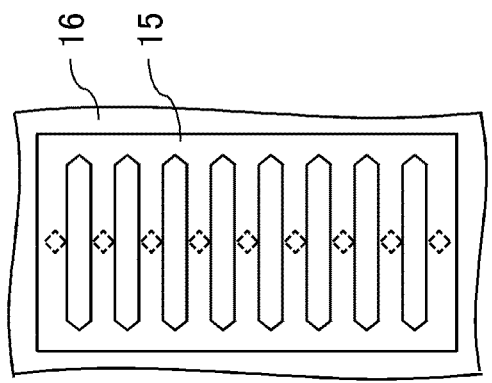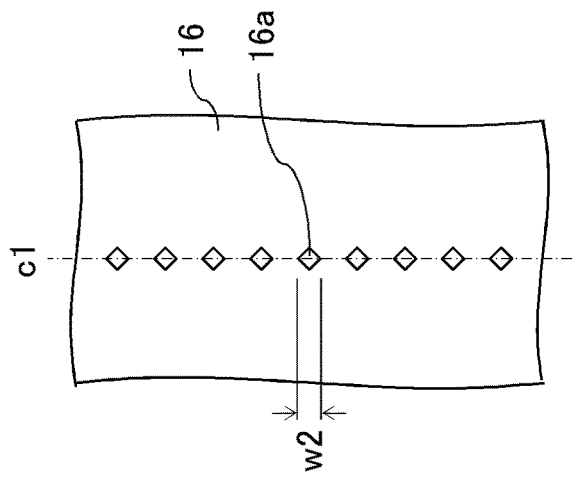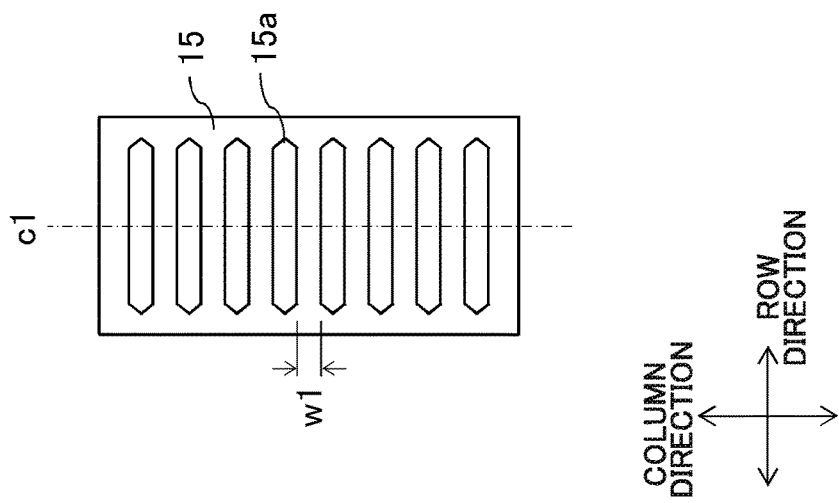

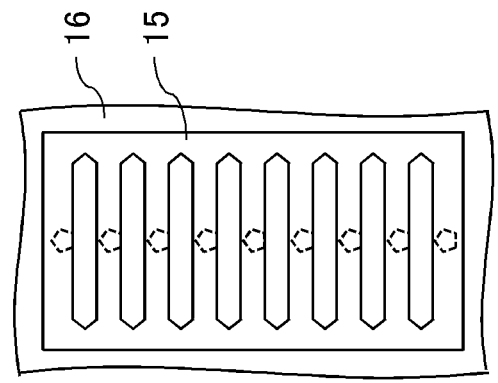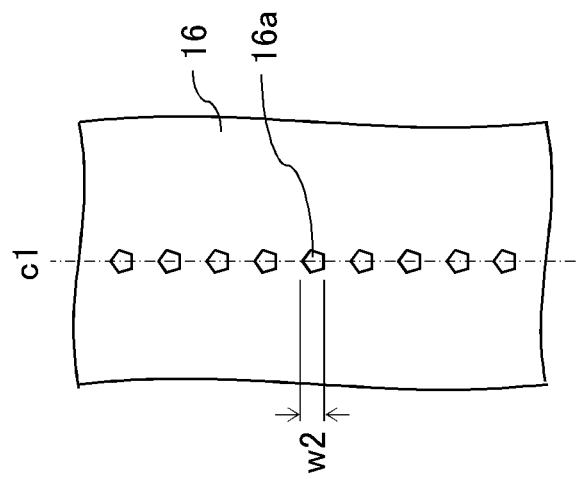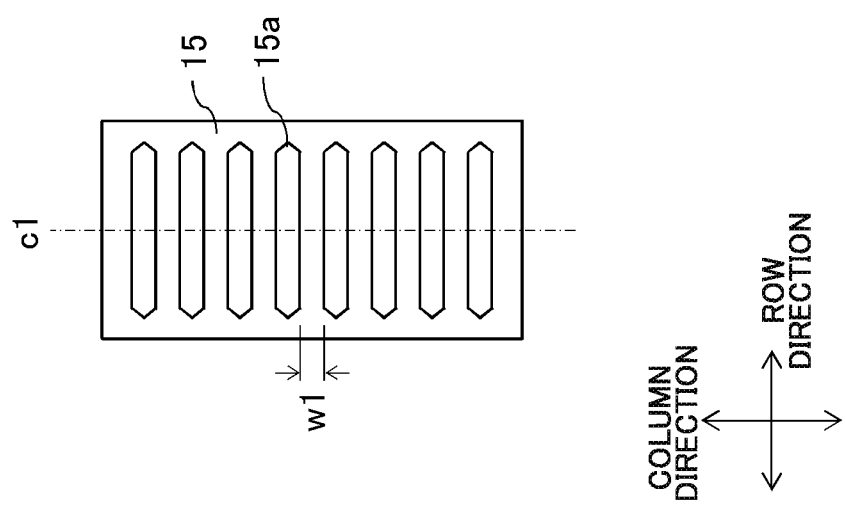

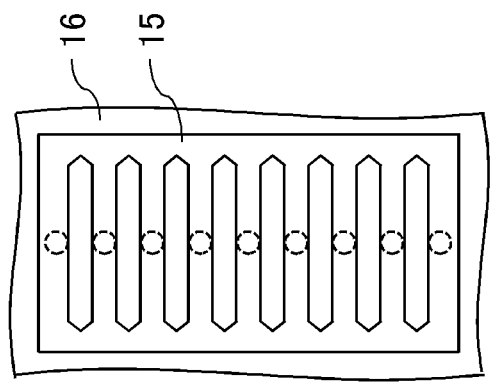
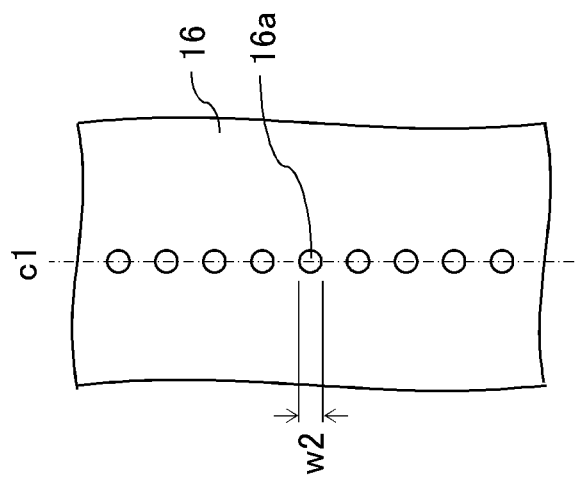
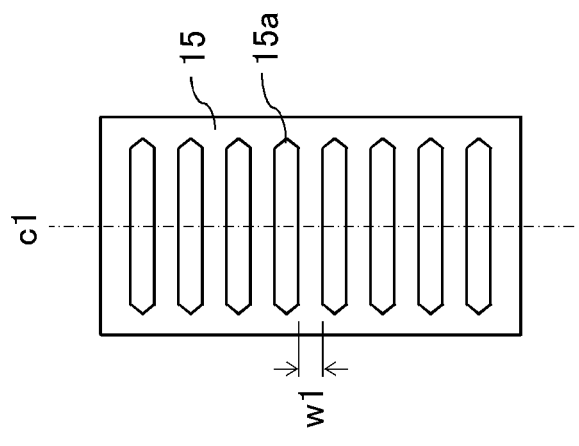

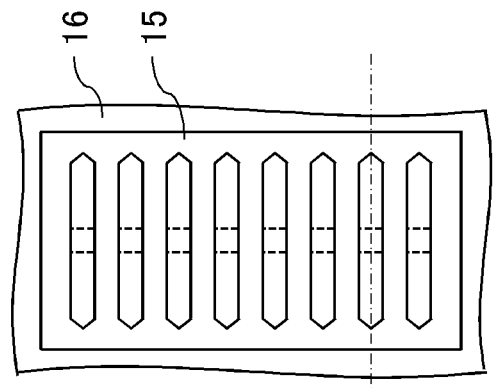
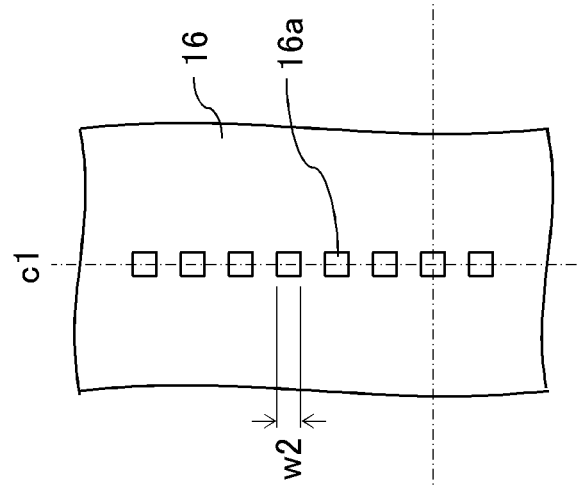
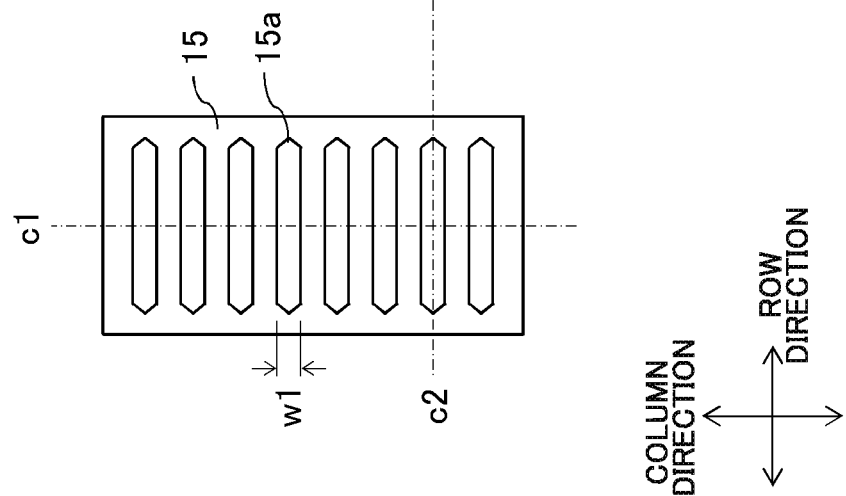

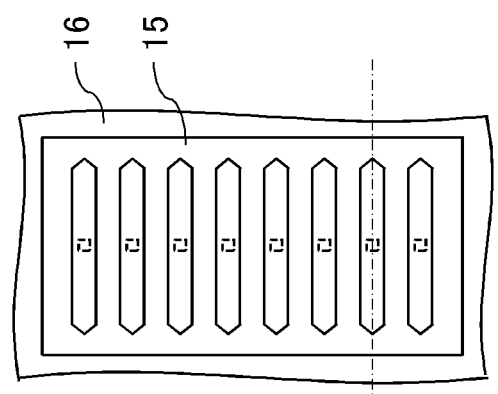
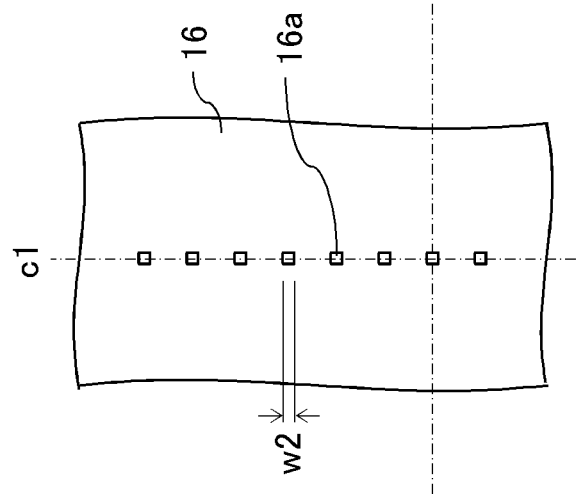
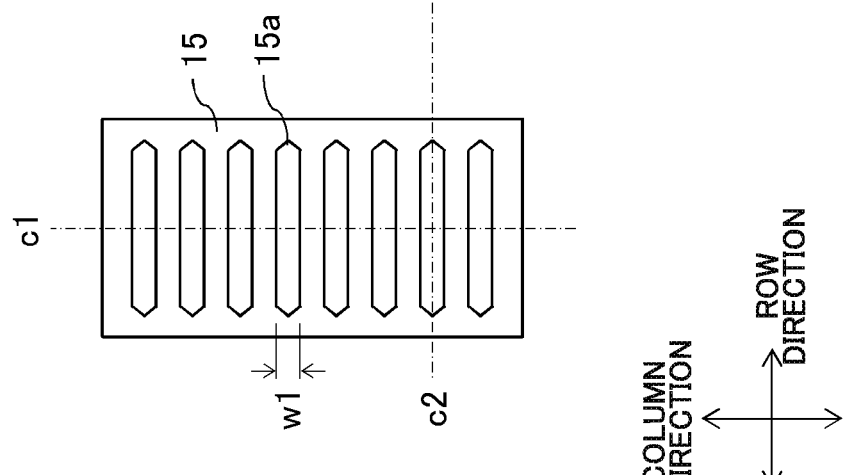

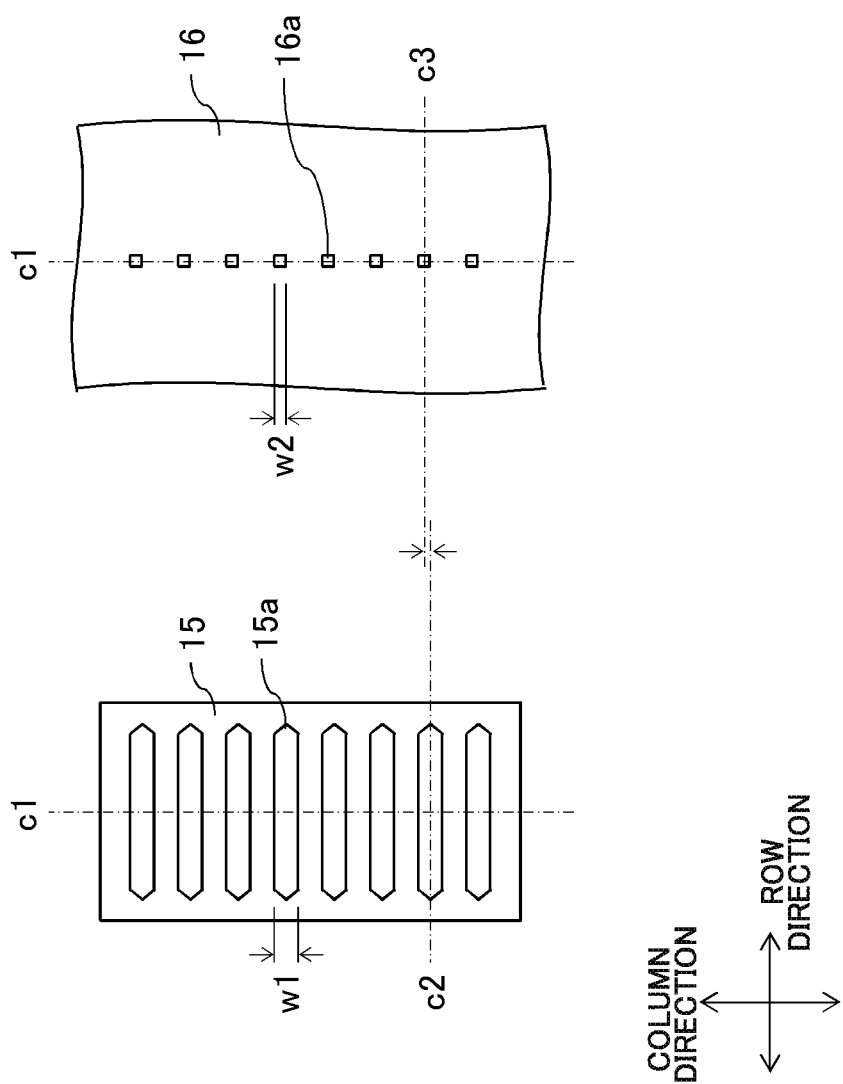

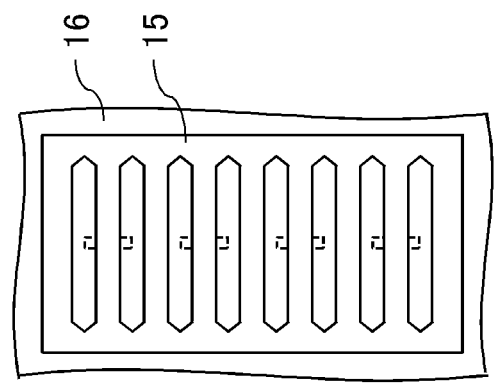
FIG.34C
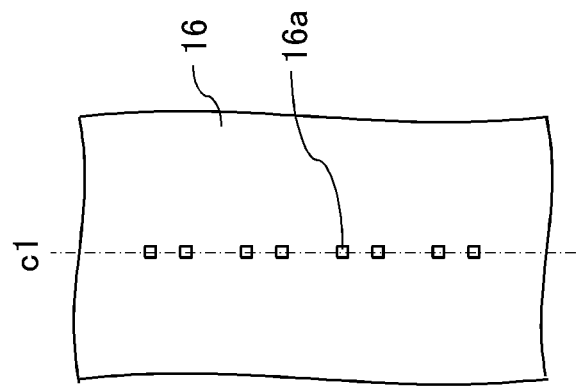
FIG.34B
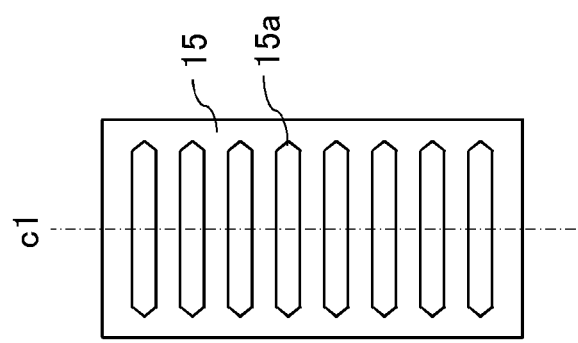
FIG.34A
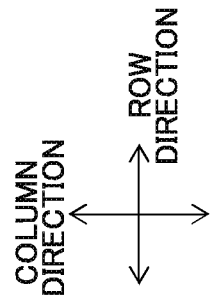

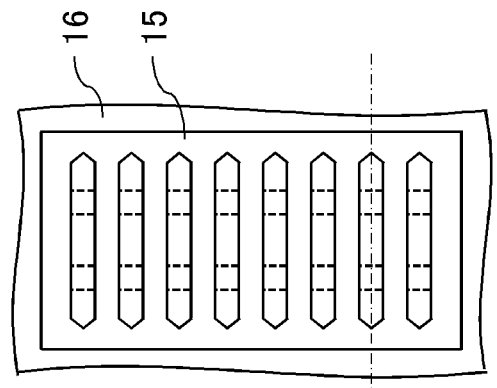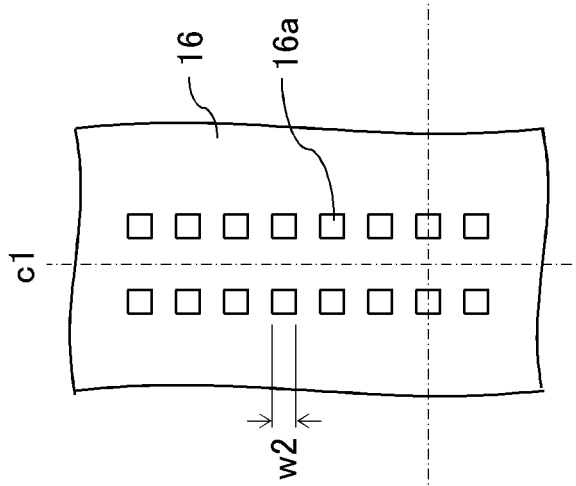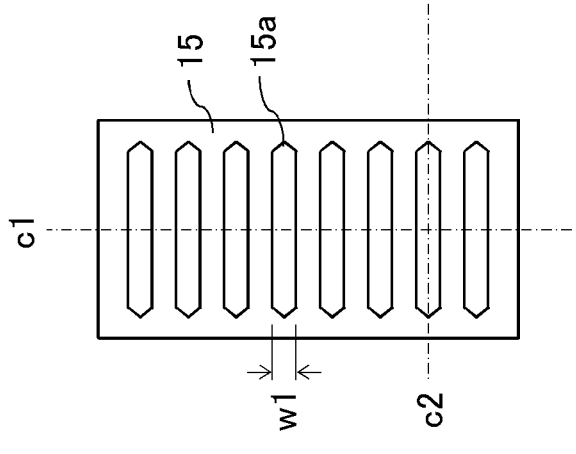

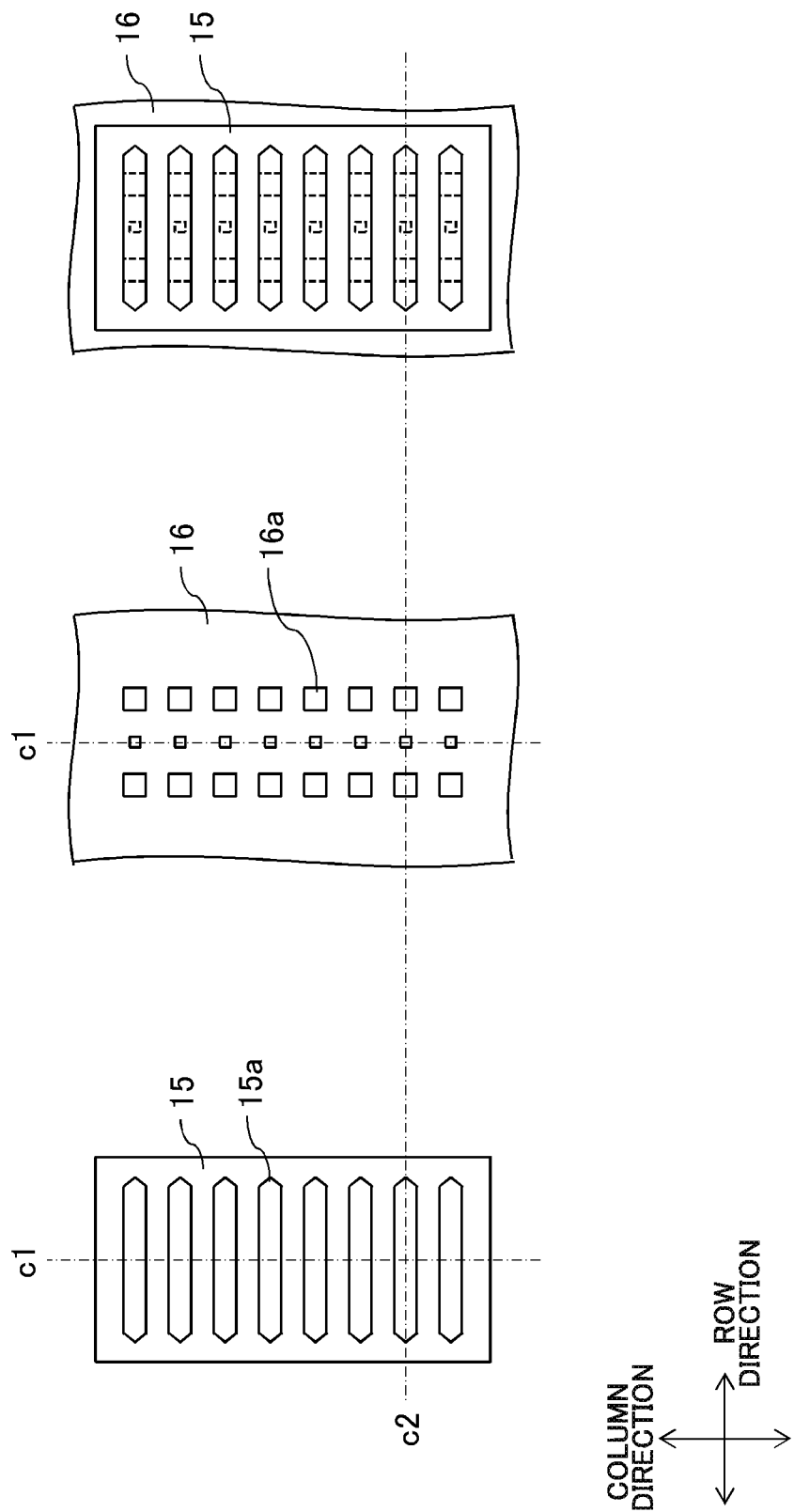

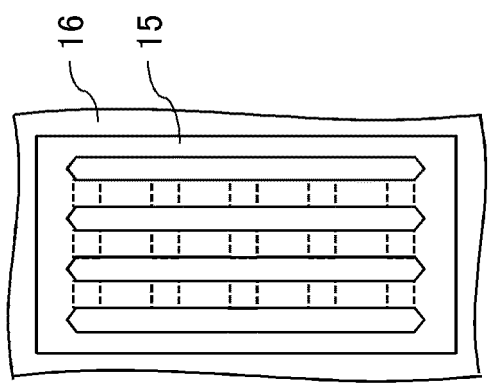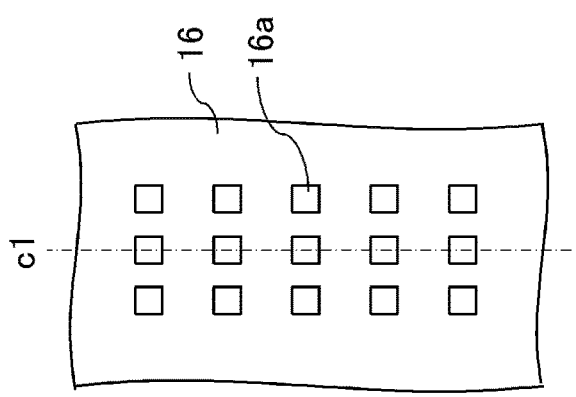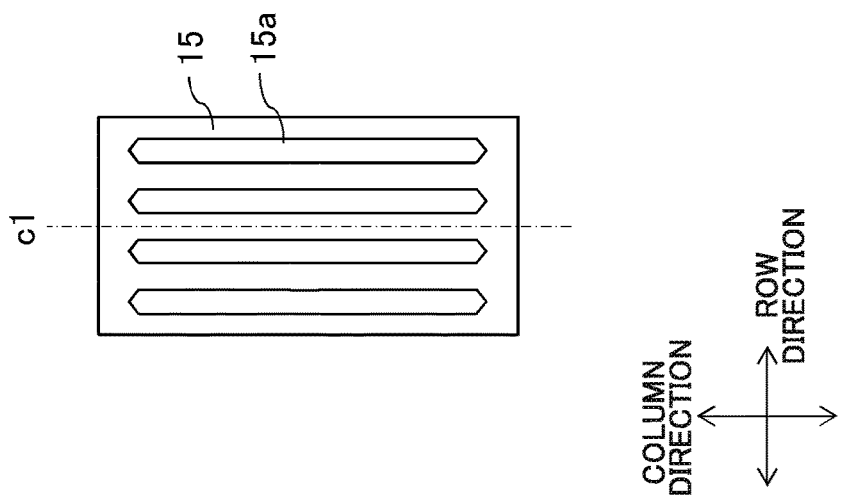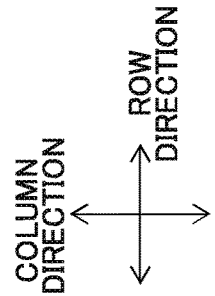

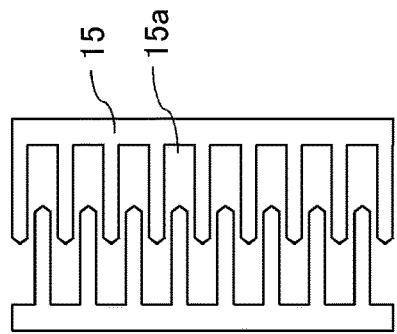
FIG.41D
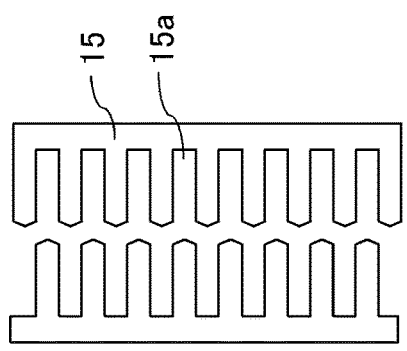
FIG.41C
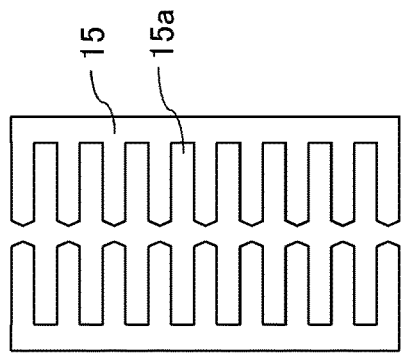
FIG.41B
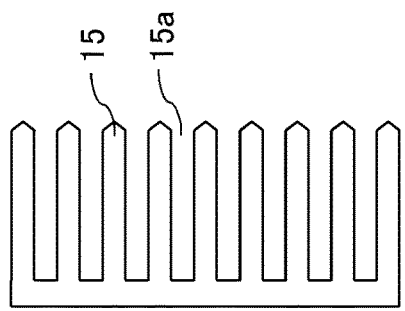
FIG.41A
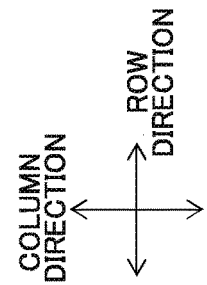

FIG.43
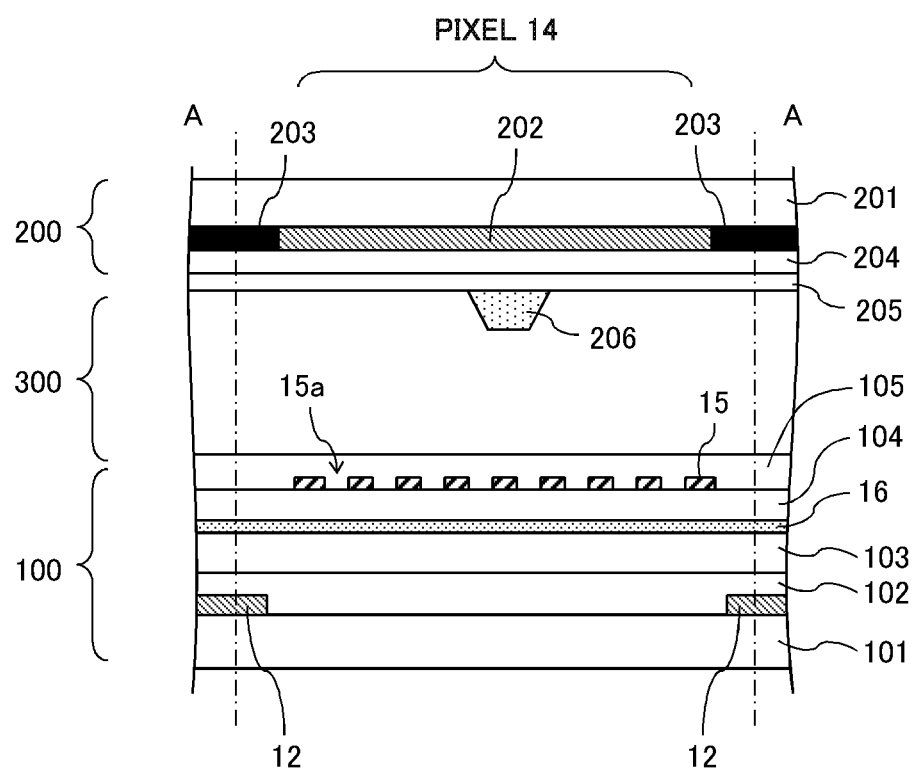
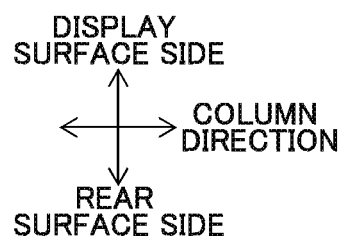

LIQUID CRYSTAL DISPLAY DEVICE

CROSS-REFERENCE TO RELATED APPLICATION

This application is a bypass continuation of international patent application PCT/JP2016/001068, filed on Feb. 26, 2016 designating the United States of America. Priority is claimed based on a Japanese patent application JP2015-110550, filed on May 29, 2015. The entire disclosures of these international and Japanese patent applications are incorporated herein by reference in their entirety.

TECHNICAL FIELD

The present disclosure relates to a liquid crystal display device, especially a lateral electric field system liquid crystal display device.

BACKGROUND

In various liquid crystal display devices, a lateral electric field system liquid crystal display device (for example, see Japanese Unexamined Patent Application Publication No. 2008-180928) has an advantage of an excellent wide viewing angle characteristic. For example, the lateral electric field system liquid crystal display device includes a pixel electrode and a common electrode in one of a pair of substrates, which are disposed opposite each other with a liquid crystal layer interposed between the pair of substrates. An electric field (lateral electric field) in a direction parallel to a substrate surface is generated between the pixel electrode and the common electrode, and the lateral electric field is applied to liquid crystal to drive the liquid crystal, whereby an amount of light transmitted through the liquid crystal layer is controlled to display an image. Examples of the lateral electric field system include an IPS (In Plane Switching) system and an FFS (Fringe Field Switching) system.

However, in the conventional lateral electric field system liquid crystal display device, a response speed of the liquid crystal is delayed due to a large size of each domain formed in a pixel and a small number of the domains.

The present disclosure has been made in view of the above problem, and an object thereof is to improve the viewing angle characteristic and the response speed in the lateral electric field system liquid crystal display device.

SUMMARY

In one general aspect, the instant application describes a liquid crystal display device including a first substrate including a first display electrode and a second display electrode that is disposed opposite the first display electrode with an insulator interposed between the first display electrode and the second display electrode, a second substrate disposed opposite the first substrate; and a liquid crystal layer disposed between the first substrate and the second substrate. The first display electrode includes a plurality of first openings in each pixel, and an interior angle of at least one apex constituting the first opening is different from interior angles of another apex in each of the plurality of first openings.

The above general aspect may include one or more of the following features.

The plurality of first openings may be disposed in parallel to each other, and the plurality of first openings may be disposed such that a long direction of the first opening is parallel to a short direction of the pixel.

In each of the plurality of first openings, at least one end of the first opening may project toward an outside of an opening region.

In each of the plurality of first openings, at least one end of the first opening may be inwardly dented toward an opening region.

Each of the plurality of first openings may be formed into one of a hexagonal shape, a trapezoidal shape, and a parallelogram shape.

The second display electrode may be formed into a fully flat shape with respect to each pixel region.

The second display electrode may include a plurality of second openings disposed corresponding to positions of the plurality of first openings.

At least a part in each of the plurality of second openings may overlap with an electrode portion between the two first openings adjacent to each other in the first display electrode in planar view.

A whole opening region in each of the plurality of second openings may overlap with each of the plurality of first openings in planar view.

The plurality of second openings may be arranged in a direction orthogonal to a long direction of the first opening.

The plurality of second openings may be arranged in a long direction of the first opening.

In each of the plurality of second openings, a width in a first direction that is of a direction in which the plurality of first openings are arranged may be equal to a width in the first direction of an electrode portion between the two first openings adjacent to each other or a width in the first direction of the first opening.

Each of the plurality of second openings may be formed into one of a square shape, a rectangular shape, a triangular shape, a rhombic shape, a polygonal shape, a circular shape, and an elliptic shape.

One of the first display electrode and the second display electrode may be disposed in a lower layer, and another one of the first display electrode and the second display electrode may be disposed in an upper layer with the insulator interposed between the first display electrode and the second display electrode.

At least one of the first substrate and the second substrate may include a projection that controls alignment of liquid crystal.

One of the first display electrode and the second display electrode may be a pixel electrode, and another one of the first display electrode and the second display electrode may be a common electrode.

In the liquid crystal display device of the present disclosure, a lateral electric field system liquid crystal display device can achieve a wide viewing angle characteristic and high-speed response time.

BRIEF DESCRIPTION OF THE DRAWINGS

FIG. 3 is a sectional view taken along line A-A in FIG. 2;

FIG. 4 is a sectional view taken along line B-B in FIG. 2;

FIG. 5 is a sectional view taken along line C-C in FIG. 2;

FIGS. 7A, 7B, 7C, 7D, 7E and 7F are plan views schematically illustrating pixel electrodes of configuration example 1 to 6;

FIG. 9 is a sectional view taken along line A-A in FIG. 8;

FIG. 10 is a sectional view taken along line B-B in FIG. 8;

FIGS. 13A, 13B and 13C are plan views schematically illustrating pixel electrode and common electrode of configuration example 8;

FIGS. 14A, 14B and 14C are plan views schematically illustrating pixel electrode and common electrode of configuration example 9;

FIGS. 15A, 15B and 15C are plan views schematically illustrating pixel electrode and common electrode of configuration example 10;

FIGS. 17A, 17B and 17C are plan views schematically illustrating pixel electrode and common electrode of configuration example 12;

FIGS. 18A, 18B and 18C are plan views schematically illustrating pixel electrode and common electrode of configuration example 13;

FIGS. 19A, 19B and 19C are plan views schematically illustrating pixel electrode and common electrode of configuration example 14;

FIGS. 20A, 20B and 20C are plan views schematically illustrating pixel electrode and common electrode of configuration example 15;

FIGS. 21A, 21B and 21C are plan views schematically illustrating pixel electrode and common electrode of configuration example 16;

FIGS. 22A, 22B and 22C are plan views schematically illustrating pixel electrode and common electrode of configuration example 17;

FIGS. 25A, 25B and 25C are plan views schematically illustrating pixel electrode and common electrode of configuration example 20;

FIGS. 27A, 27B and 27C are plan views schematically illustrating pixel electrode and common electrode of configuration example 22;

FIGS. 28A, 28B and 28C are plan views schematically illustrating pixel electrode and common electrode of configuration example 23;

FIGS. 29A, 29B and 29C are plan views schematically illustrating pixel electrode and common electrode of configuration example 24;

FIGS. 30A, 30B and 30C are plan views schematically illustrating pixel electrode and common electrode of configuration example 25;

FIGS. 31A, 31B and 31C are plan views schematically illustrating pixel electrode and common electrode of configuration example 26;

FIGS. 32A, 32B and 32C are plan views schematically illustrating pixel electrode and common electrode of configuration example 27;

FIGS. 33A, 33B and 33C are plan views schematically illustrating pixel electrode and common electrode of configuration example 28;

FIGS. 34A, 34B and 34C are plan views schematically illustrating pixel electrode and common electrode of configuration example 29;

FIGS. 35A, 35B and 35C are plan views schematically illustrating pixel electrode and common electrode of configuration example 30;

FIGS. 36A, 36B and 36C are plan views schematically illustrating pixel electrode and common electrode of configuration example 31;

FIGS. 40A, 40B and 40C are plan views schematically illustrating pixel electrode and common electrode of configuration example 35;

FIGS. 41A, 41B, 41C and 41D are plan views schematically illustrating another configuration of pixel electrode;

FIG. 43 is a cross section view illustrating another schematic configuration of a liquid crystal display device;

DETAILED DESCRIPTION

An embodiment of the present application is described below with reference to the drawings.

Figure 1:
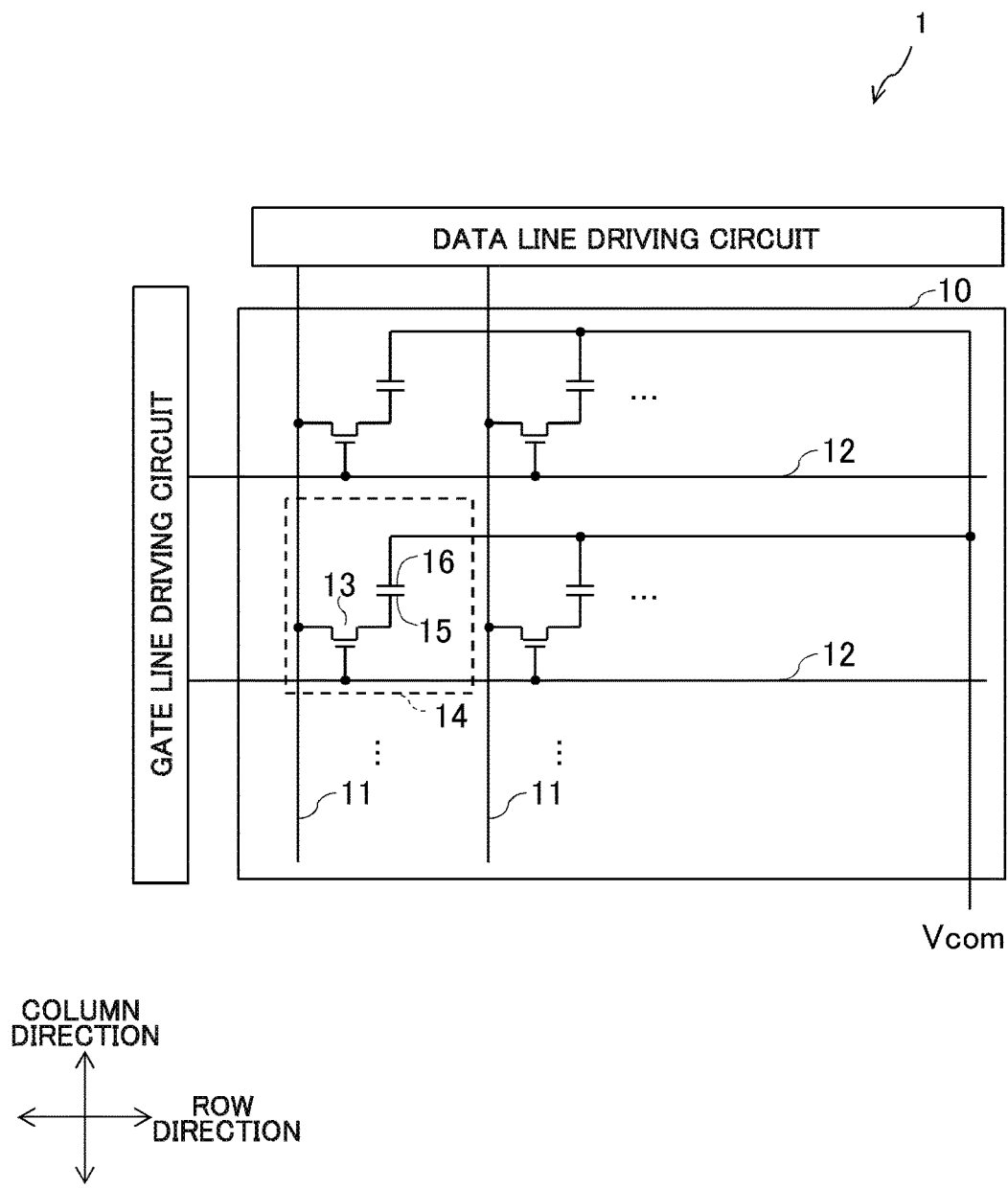
FIG. 1 is a plan view illustrating a schematic configuration of a liquid crystal display device according to an exemplary embodiment.

FIG. 1 is a plan view illustrating a schematic configuration of a liquid crystal display device according to an exemplary embodiment. Liquid crystal display device 1 includes display panel 10 that displays an image, a driving circuit (a data line driving circuit and a gate line driving circuit) that drives display panel 10, a control circuit (not illustrated) that controls the driving circuit, and a backlight (not illustrated) that irradiates display panel 10 with light from a rear surface side. The driving circuit may be provided in display panel 10.

A plurality of data lines 11 extending in a column direction and a plurality of gate lines 12 extending in a row direction are provided in display panel 10. Thin film transistor (TFT) 13 is provided in an intersection of each data line 11 and each gate line 12.

In display panel 10, a plurality of pixels 14 are arranged into a matrix shape (the row direction and the column direction) corresponding to the intersections of data lines 11 and gate lines 12. Although being described in detail later, display panel 10 includes a thin film transistor substrate (TFT substrate), a color filter substrate (CF substrate), and a liquid crystal layer sandwiched between the TFT substrate and the CF substrate. A plurality of pixel electrodes 15 disposed corresponding to each pixel 14 and one common electrode 16 common to the plurality of pixels 14 are provided in TFT substrate. Common electrode 16 is disposed while divided in each one pixel 14 or each plurality of pixels 14. Pixel electrode 15 and common electrode 16 act as a display electrode.

Figure 2:
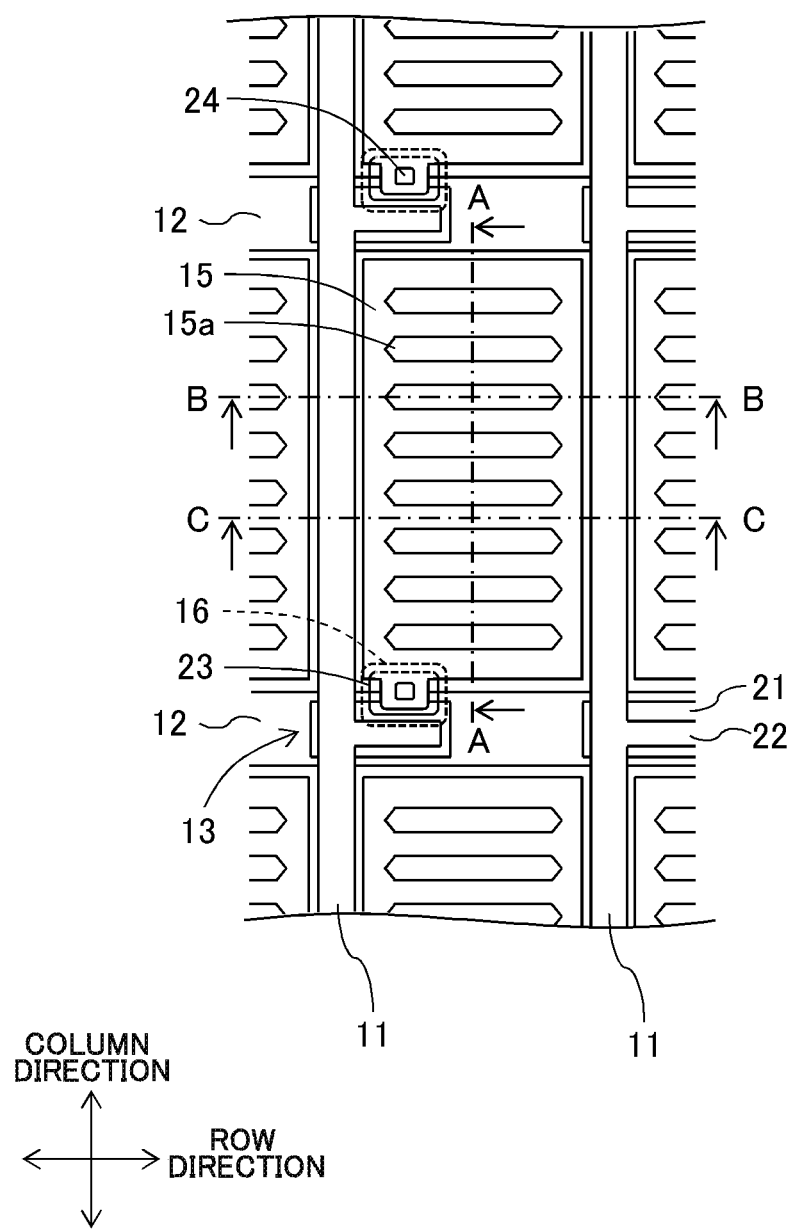
FIG. 2 is a plan view illustrating a configuration of pixel.

FIG. 2 is a plan view illustrating a configuration of pixel 14. FIG. 3 is a sectional view taken along line A-A in FIG. 2, FIG. 4 is a sectional view taken along line B-B in FIG. 2, and FIG. 5 is a sectional view taken along line C-C in FIG. 2. A specific configuration of display panel 10 will be described with reference to FIGS. 2 to 5.

In FIG. 2, a region partitioned by two adjacent data lines 11 and two adjacent gate lines 12 corresponds to one pixel 14. Thin film transistor 13 is provided in each pixel 14. Thin film transistor 13 includes semiconductor layer 21 formed on insulator 102 (see FIG. 3) and drain electrode 22 and source electrode 23, which are formed on semiconductor layer 21 (see FIG. 2). Drain electrode 22 is electrically connected to data line 11, and source electrode 23 is electrically connected to pixel electrode 15 through through-hole 24.

Pixel electrode 15 made of a transparent conductive film such as indium tin oxide (ITO) is formed in each pixel 14. Pixel electrode 15 includes a plurality of openings 15a (slits), and is formed into a stripe shape. Each opening 15a is formed into a horizontally-long polygonal shape, and long sides of a plurality of sides constituting opening 15a extend in a row direction. The plurality of openings 15a have a substantially identical shape, and are arranged at substantially equal intervals in the column direction. Openings 15a are formed so as to be symmetric with respect to a center in the row direction of pixel 14. There is no limitation to the number of openings 15a formed in one pixel electrode 15. A shape of opening 15a is not limited to the shape in FIG. 2.

One common electrode 16 made of a transparent conductive film such as ITO is formed commonly in each pixel 14 over a display region. Common electrode 16 is formed into a fully flat shape. An opening is formed in a region where common electrode 16 overlaps with through-hole 24 and source electrode 23 of thin film transistor 13 in order to electrically connect pixel electrode 15 and source electrode 23. Common electrode 16 is not limited to the fully flat shape.

As illustrated in FIG. 3, display panel 10 includes TFT substrate 100 (first substrate) disposed on the rear surface side, CF substrate 200 (second substrate) disposed on the display surface side, and liquid crystal layer 300 sandwiched between TFT substrate 100 and CF substrate 200.

In TFT substrate 100, gate line 12 is formed on glass substrate 101, and insulator 102 is formed so as to cover gate line 12. Data line 11 (FIGS. 4 and 5) is formed on insulator 102, and insulator 103 is formed so as to cover data line 11. Common electrode 16 is formed on insulator 103, and insulator 104 is formed so as to cover common electrode 16. Pixel electrode 15 is formed on insulator 104, and alignment film 105 is formed so as to cover pixel electrode 15. Although not illustrated, a polarizing plate and the like are formed in TFT substrate 100. A laminate structure of each unit constituting pixel 14 is not limited to the configurations in FIGS. 3 to 5, but any known configuration can be applied.

Pixel electrode 15 and common electrode 16 are disposed opposite each other with insulator 104 interposed between pixel electrode 15 and common electrode 16. As illustrated in FIG. 3, when viewed from the display surface side, opening 16a of common electrode 16 is disposed so as to overlap with the region (electrode portion) between two openings 15a adjacent to each other in the column direction of pixel electrode 15. Similarly, when viewed from the display surface side, opening 15a of pixel electrode 15 is disposed so as to overlap with the region (electrode portion) between two openings 16a adjacent to each other in the column direction of common electrode 16. A width in the column direction of opening 16a of common electrode 16 is substantially equal to a width (a width in the column direction of the electrode portion) between two openings 15a adjacent to each other in the column direction of pixel electrode 15.

In CF substrate 200, black matrix 203 and colored portion 202 (for example, a red portion, a green portion, and a blue portion) are formed on glass substrate 201, and overcoat layer 204 is formed so as to cover black matrix 203 and colored portion 202. Alignment film 205 is formed on overcoat layer 204. Although not illustrated, a polarizing plate and the like are formed in CF substrate 200.

Liquid crystal 301 is sealed in liquid crystal layer 300. Liquid crystal 301 may be negative liquid crystal having a negative dielectric anisotropy or positive liquid crystal having a positive dielectric anisotropy.

Alignment films 105, 205 may be an alignment film subjected to a rubbing alignment treatment or a photo-alignment film subjected to a photo-alignment treatment.

As described above, liquid crystal display device 1 has the configuration of the IPS (In Plane Switching) system. The configuration of liquid crystal display device 1 is not limited to the above configuration.

A method for driving liquid crystal display device 1 will briefly be described. A scanning gate signal (gate-on voltage, gate-off voltage) is supplied from the gate line driving circuit to gate line 12. A video data voltage is supplied from the data line driving circuit to data line 11. When the gate-on voltage is supplied to gate line 12, thin film transistor 13 is turned on, and the data voltage supplied to data line 11 is transmitted to pixel electrode 15 through drain electrode 22 and source electrode 23. Common voltage (Vcom) is supplied from a common electrode driving circuit (not illustrated) to common electrode 16. Common electrode 16 overlaps with pixel electrode 15 with insulator 104 interposed between common electrode 16 and pixel electrode 15, and opening 15a (slit) is formed in pixel electrode 15. Therefore, liquid crystal 301 is driven by an electric field from pixel electrode 15 to common electrode 16 through liquid crystal layer 300 and opening 15a of pixel electrode 15. Liquid crystal 301 is driven to control transmittance of light transmitted through liquid crystal layer 300, and thus displaying the image. For performing color display, a desired data voltage is supplied to data line connected to pixel electrode 15 of pixel 14 corresponding to each of the red portion, green portion, and blue portion, which are formed by a vertical stripe color filter. The method for driving liquid crystal display device 1 is not limited to the above method, but any known method may be adopted.

Liquid crystal display device 1 of the exemplary embodiment has a characteristic electrode structure in FIG. 2, and thus achieving a wide viewing angle characteristic and high-speed responsiveness. Configuration examples of the electrode structures applicable to liquid crystal display device 1 will be listed below. The description of the component common to the configuration examples will be omitted as appropriate.

Figure 6C:
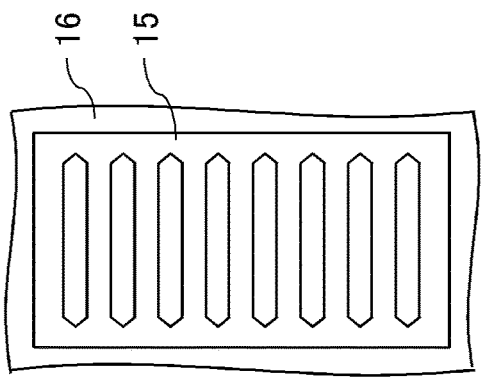
FIGS. 6A, 6B and 6C are plan views schematically illustrating pixel electrode and common electrode of configuration example 1.
Figure 6B:
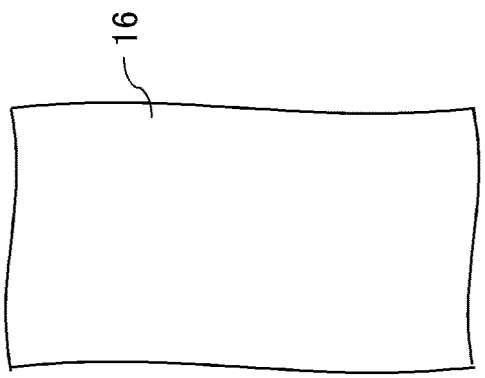
Figure 6A:
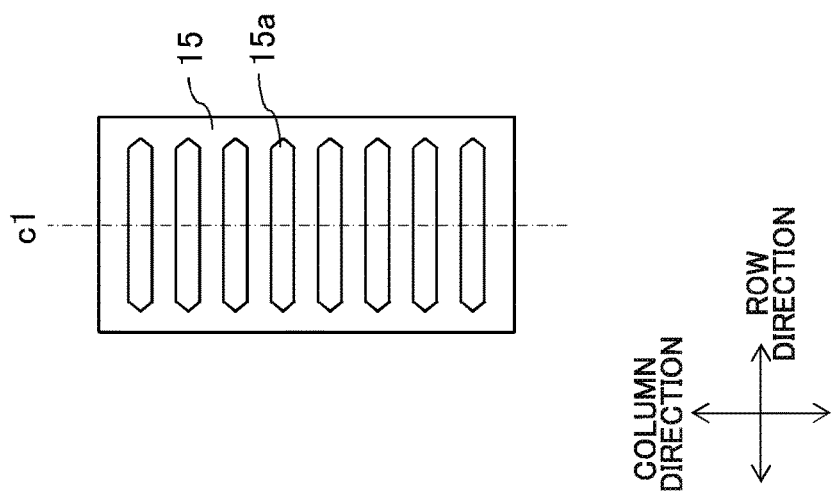

FIGS. 6A, 6B and 6C are plan views schematically illustrating pixel electrode 15 and common electrode 16 of configuration example 1. FIG. 6A illustrates a planar configuration of one pixel electrode 15 corresponding to one pixel 14, FIG. 6B illustrates a planar configuration of a portion of common electrode 16 corresponding to one pixel 14, and FIG. 6C illustrates a planar configuration of a state in which pixel electrode 15 and common electrode 16, which correspond to one pixel 14, overlap with each other. In FIG. 6C, for convenience, opening 16a of common electrode 16 is indicated by a dotted line.

In configuration example 1 of FIG. 6A, opening 15a of pixel electrode 15 is formed into a (horizontally-long) hexagonal shape elongated in the row direction, and interior angles of all apexes are larger than 90 degrees and smaller than 180 degrees. The plurality of openings 15a have a substantially identical shape, and are arranged at substantially equal intervals in the column direction. Openings 15a are formed so as to be symmetric with respect to center line c1 in the row direction of pixel 14. That is, opening 15a has a structure in which both right and left ends (both ends in the row direction) project outside. Common electrode 16 is formed into a fully flat shape.

Opening 15a of pixel electrode 15 is not limited to the shape of configuration example 1, but various shapes can be applied. FIGS. 7A, 7B, 7C, 7D, 7E and 7F are plan views illustrating a configuration example of pixel electrode 15. FIG. 7A illustrates pixel electrode 15 of configuration example 1.

In pixel electrode 15 of configuration example 2 in FIG. 7B, opening 15a is formed into a (horizontally-long) hexagonal shape elongated in the row direction, interior angles of three apexes on the right side are larger than 90 degrees and smaller than 180 degrees, interior angles of upper and lower two apexes on the left side are smaller than 90 degrees, and an interior angle of a central apex on the left side is larger than 180 degrees. That is, opening 15a has a structure in which the left end is inwardly dented while the right end projects outside.

In pixel electrode 15 of configuration example 3 in FIG. 7C, opening 15a is formed into a (horizontally-long) hexagonal shape elongated in the row direction, interior angles of four apexes on the right, left, upper and lower sides are smaller than 90 degrees, and interior angles of two apexes at the central ends on the right and left sides are larger than 180 degrees. That is, opening 15a has a structure in which the right and left ends are inwardly dented.

In pixel electrode 15 of configuration example 4 in FIG. 7D, opening 15a is formed into a (horizontally-long) trapezoidal shape elongated in the row direction.

In pixel electrode 15 of configuration example 5 in FIG. 7E, opening 15a is formed into a (horizontally-long) parallelogram shape elongated in the row direction.

In pixel electrode 15 of configuration example 6 in FIG. 7F, the plurality of openings 15a are formed in the row direction. In FIG. 7F, two openings 15a are formed in the row direction. Alternatively, at least three openings 15a may be formed in the row direction. The shape of opening 15a is not limited to configuration example 1, but may be one of configuration examples 2 to 5 or a combination of a plurality of kinds of configuration examples 1 to 5.

Thus, in opening 15a of pixel electrode 15, an interior angle of at least one apex constituting opening 15a is different from interior angles of other apexes. In other words, in opening 15a of pixel electrode 15, at least one side constituting opening 15a extends in an oblique direction with respect to other sides. Openings 15a are disposed in parallel to each other, and openings 15a are disposed such that a long direction of opening 15a is in parallel to a short direction of pixel 14. Openings 15a may be disposed in parallel to each other, and the long direction of opening 15a may be disposed so as to extend in the oblique direction with respect to the short direction of pixel 14. At least one of a plurality of sides constituting opening 15a may be formed by a curved line.

In configuration examples 1 to 6, common electrode 16 is formed into a fully flat shape. However, common electrode 16 of the exemplary embodiment is not limited to the fully flat shape, but may include opening 16a.

Figure 8:
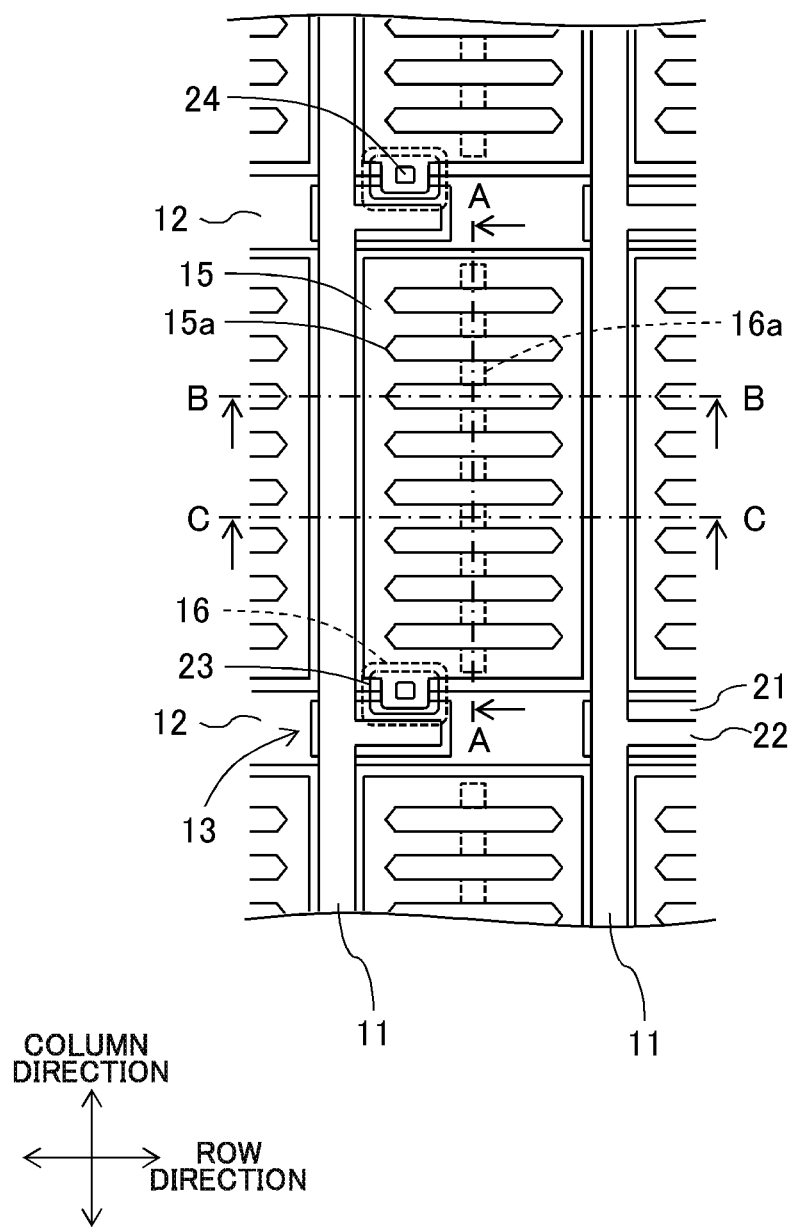
FIG. 8 is another plan view illustrating a configuration of pixel.
Figure 11:
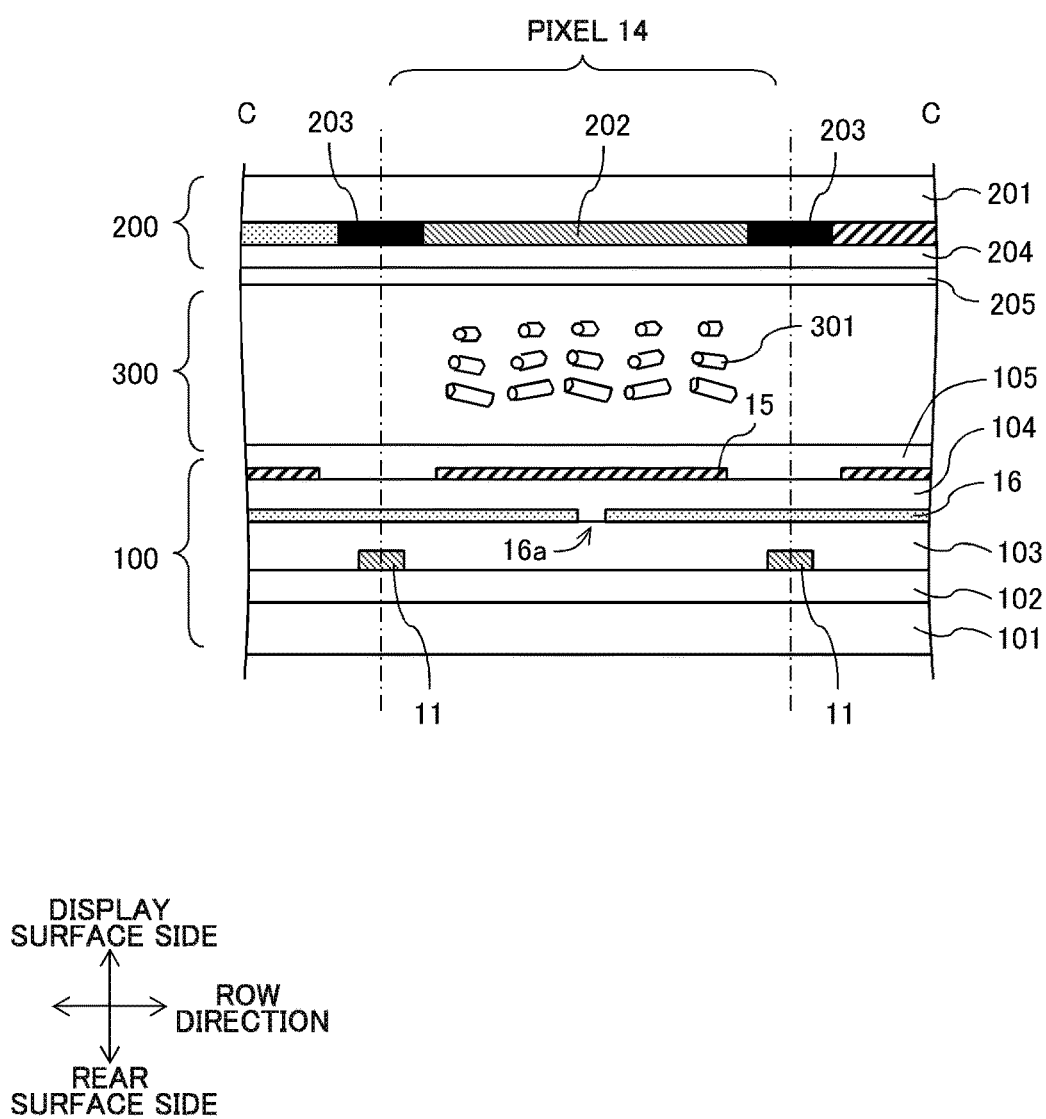
FIG. 11 is a sectional view taken along line C-C in FIG. 8.

FIG. 8 is a plan view illustrating another configuration of pixel 14. FIG. 9 is a sectional view taken along line A-A in FIG. 8, FIG. 10 is a sectional view taken along line B-B in FIG. 8, and FIG. 11 is a sectional view taken along line C-C in FIG. 8.

Common electrode 16 includes a plurality of openings 16a corresponding to each pixel 14. Each opening 16a is formed into a square shape, two sides opposite each other in four sides constituting opening 16a extend in the row direction, and other two sides opposite each other extend in the column direction. The plurality of openings 16a have a substantially identical shape, and are arranged at substantially equal intervals in the column direction. Openings 16a are formed so as to be symmetric with respect to the center in the row direction of pixel 14. In planar view (when viewed from the display surface side in FIG. 3), opening 16a is disposed so as to overlap with a region (electrode portion) between two openings 15a adjacent to each other in the column direction of pixel electrode 15. Similarly, when viewed from the display surface side, opening 15a of pixel electrode 15 is disposed so as to overlap with the region (electrode portion) between two openings 16a adjacent to each other in the column direction of common electrode 16. Therefore, for example, opening 15a of pixel electrode 15 and opening 16a of common electrode 16 are alternately disposed in the column direction in planar view. A width in the column direction of opening 16a of common electrode 16 is substantially equal to a width (a width in the column direction of the electrode portion) between two openings 15a adjacent to each other in the column direction of pixel electrode 15. There is no limitation to a shape, a number, and a position of opening 16a.

Figure 12A:
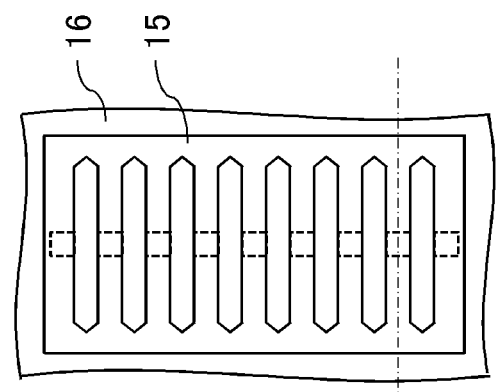
FIGS. 12A, 12B and 12C are plan views schematically illustrating pixel electrode and common electrode of configuration example 7.
Figure 12B:
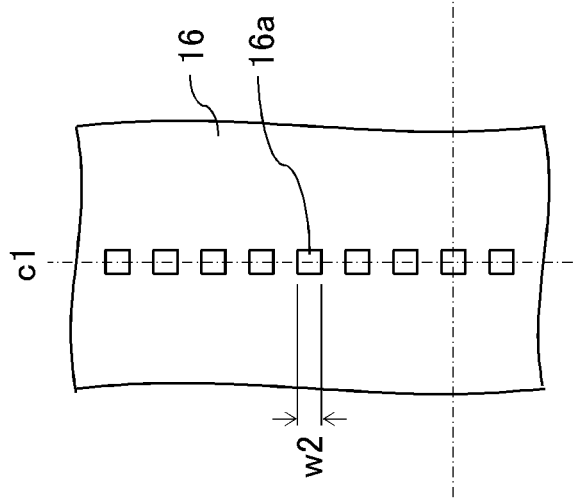
Figure 12C:
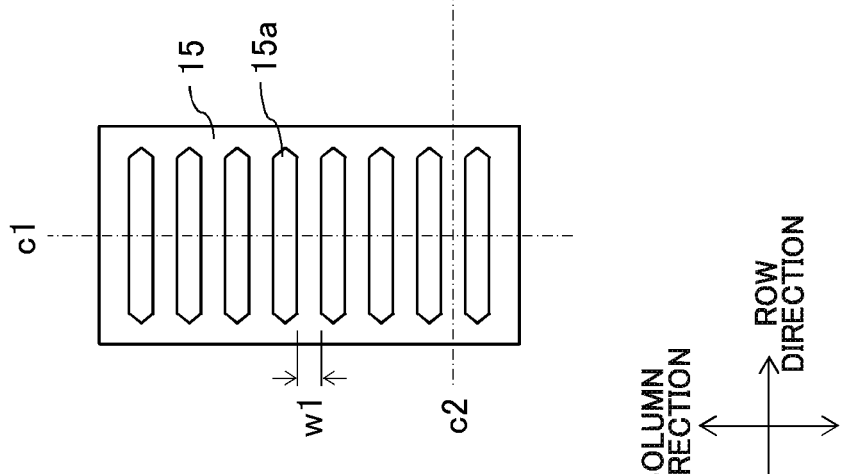

In configuration example 7 of FIG. 12, openings 15a are formed so as to be symmetric with respect to center line c1 in the row direction of pixel 14. It is assumed that w1 is a width in the column direction of the region (electrode portion) between two openings 15a adjacent to each other in the column direction. Opening 16a of common electrode 16 is formed into a square shape in which one side has a length w2. The plurality of openings 16a have a substantially identical shape, and are arranged at substantially equal intervals in the column direction. Openings 16a are formed so as to be symmetric with respect to center line c1 in the row direction of pixel 14. Width w1 of opening 15a is substantially equal to width w2 of opening 16a (w1≈w2). As indicated by line c2 in FIG. 12, pixel electrode 15 and common electrode 16 are disposed such that a center line of the width in the column direction of the electrode portion of pixel electrode 15 is matched with a center line of the width in the column direction of opening 16a. That is, as illustrated in FIG. 12C, each opening 16a is disposed such that a whole opening region overlaps with the electrode portion of pixel electrode 15 in planar view. In FIG. 12C, for convenience, opening 16a of common electrode 16 is indicated by a dotted line. This applies to the subsequent figures.

FIGS. 13A, 13B and 13C are plan views schematically illustrating pixel electrode 15 and common electrode 16 of configuration example 8. In configuration example 8, opening 16a of common electrode 16 is formed into a square shape, length w2 of one side is larger than width w1 of the electrode portion of pixel electrode 15 (w2>w1). Each opening 16a is disposed so as to overlap with the electrode portion of pixel electrode 15 in planar view. As indicated by line c2 in FIGS. 13A, 13B and 13C, pixel electrode 15 and common electrode 16 are disposed such that the center line of the width in the column direction of the electrode portion is matched with the center line of the width in the column direction of opening 16a. That is, as illustrated in FIG. 13C, each opening 16a is disposed such that an end (an upper side and a lower side) in the column direction of opening 16a protrudes evenly to opening 15a in planar view.

FIGS. 14A, 14B and 14C are plan views schematically illustrating pixel electrode 15 and common electrode 16 of configuration example 9. In configuration example 9, a position of opening 16a of common electrode 16 deviates to the column direction (in this case, to a lower side) from a position of opening 16a of common electrode 16 illustrated in configuration example 8. That is, each opening 16a is disposed such that center line c2 of the width in the column direction of the electrode portion of pixel electrode 15 deviates from center line c3 of the width in the column direction of opening 16a. As illustrated in FIG. 14C, the end (in this case, the lower side) in the column direction of opening 16a protrudes to the region of opening 15a in planar view. As illustrated in FIG. 14C, opening 16a may be disposed such that the upper side of opening 16a overlaps with the lower side of opening 15a. Opening 16a may be disposed such that the end (upper side) in the column direction of opening 16a protrudes to the region of opening 15a in planar view.

FIGS. 15A, 15B and 15C are plan views schematically illustrating pixel electrode 15 and common electrode 16 of configuration example 10. In configuration example 10, opening 16a of common electrode 16 is formed into a square shape, length w2 of one side is smaller than width w1 of the electrode portion of pixel electrode 15 (w2<w1). Each opening 16a is disposed so as to overlap with the electrode portion of pixel electrode 15 in planar view. As indicated by line c2 in FIGS. 15A, 15B and 15C, pixel electrode 15 and common electrode 16 are disposed such that the center line of the width in the column direction of the electrode portion of pixel electrode 15 is matched with the center line of the width in the column direction of opening 16a. That is, as illustrated in FIG. 15C, opening 16a is disposed such that an end (the upper side and the lower side) in the column direction of opening 16a falls within the region of the electrode portion of pixel electrode 15.

Figure 16C:
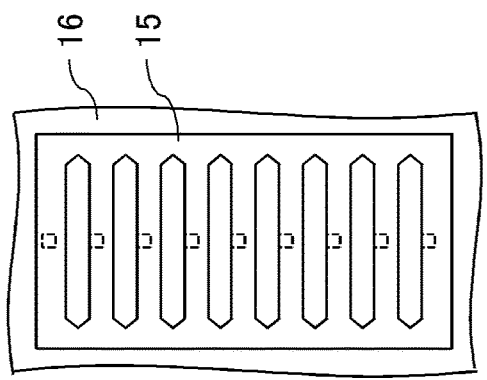
FIGS. 16A, 16B and 16C are plan views schematically illustrating pixel electrode and common electrode of configuration example 11.
Figure 16B:
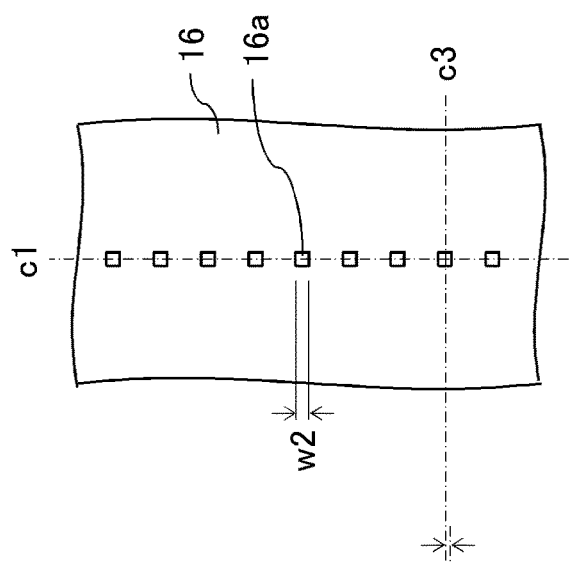
Figure 16A:
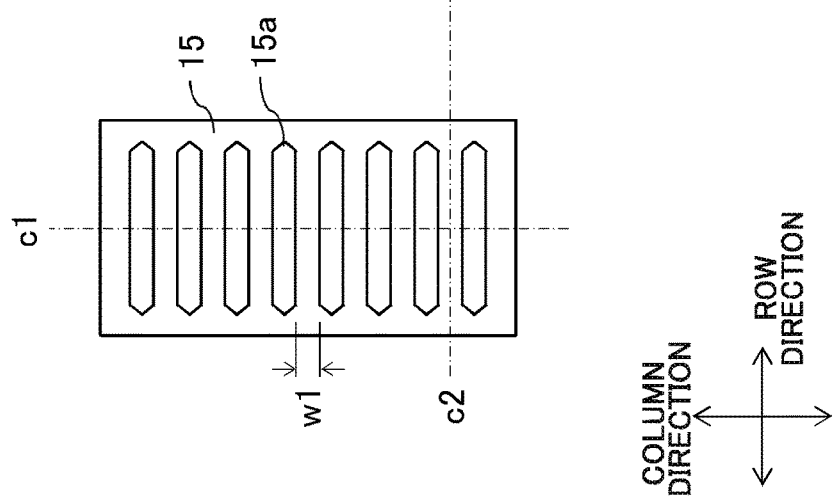

FIGS. 16A, 16B and 16C are plan views schematically illustrating pixel electrode 15 and common electrode 16 of configuration example 11. In configuration example 5, the position of opening 16a of common electrode 16 deviates to the column direction (in this case, to an upper side) from the position of opening 16a of common electrode 16 illustrated in configuration example 10. That is, each opening 16a is disposed such that center line c2 of the width in the column direction of the electrode portion of pixel electrode 15 deviates from center line c3 of the width in the column direction of opening 16a. As illustrated in FIG. 16C, opening 16a deviates so as to come close to the lower side of opening 15a in planar view. As illustrated in FIG. 16C, opening 16a may be disposed such that the upper side of opening 16a overlaps with the lower side of opening 15a. Opening 16a may deviate so as to come close to the upper side of opening 15a in planar view. The plurality of openings 16a arranged in the column direction may deviate alternately to the upper side and lower side of opening 15a in planar view.

FIGS. 17A, 17B and 17C are plan views schematically illustrating pixel electrode 15 and common electrode 16 of configuration example 12. In configuration example 12, the plurality of openings 16a of common electrode 16 are formed in the row direction. In FIG. 17B, two openings 16a are formed in the row direction. Alternatively, at least three openings 16a may be formed in the row direction. Openings 16a are formed so as to be symmetric with respect to center line c1 in the row direction of pixel 14. The above configuration examples can be applied as the size and disposition of opening 16a.

FIGS. 18A, 18B and 18C are plan views schematically illustrating pixel electrode 15 and common electrode 16 of configuration example 13. In configuration example 13, the plurality of openings 16a arranged in the row direction deviate in the column direction. That is, pixel electrode 15 and common electrode 16 are disposed such that center line c2 of the width in the column direction of the electrode portion of pixel electrode 15, center line c3 of the width in the column direction of opening 16a in the left column, and center line c4 of the width in the column direction of opening 16a in the right column deviate from one another. In this case, center line c3 of the width in the column direction of opening 16a in the left column deviates upward from center line c2 of the width in the column direction of the electrode portion of pixel electrode 15, and center line c4 of the width in the column direction of opening 16a in the right column deviates downward from center line c2 of the width in the column direction of the electrode portion of pixel electrode 15. As illustrated in FIG. 18C, in planar view, opening 16a in the left column deviates so as to come close to the upper side of opening 15a, and opening 16a in the right column deviates so as to come close to the lower side of opening 15a.

FIGS. 19A, 19B and 19C are plan views schematically illustrating pixel electrode 15 and common electrode 16 of configuration example 14. In configuration example 14, the plurality of openings 16a arranged in the column direction deviate alternately to the upper side and lower side of opening 15a in planar view.

FIGS. 20A, 20B and 20C are plan views schematically illustrating pixel electrode 15 and common electrode 16 of configuration example 15. In configuration example 15, opening 16a of common electrode 16 is formed into a square shape, length w2 of one side is larger than width w1 of opening 15a of pixel electrode 15 (w2>w1). Center line c3 of the width in the column direction of opening 16a in the left column deviates downward from center line c2 of the width in the column direction of the electrode portion of pixel electrode 15, and center line c4 of the width in the column direction of opening 16a in the right column deviates upward from center line c2 of the width in the column direction of the electrode portion of pixel electrode 15. As illustrated in FIG. 20C, in planar view, opening 16a in the left column deviates so as to come close to the lower side of opening 15a, and opening 16a in the right column deviates so as to come close to the upper side of opening 15a.

FIGS. 21A, 21B and 21C are plan views schematically illustrating pixel electrode 15 and common electrode 16 of configuration example 16. In configuration example 16, openings 16a of common electrode 16 are configured with a plurality of groups having different sizes. In the example of FIG. 21B, openings 16a are configured with a group of openings 16a in the left column, a group of openings 16a in the middle column, and a group of openings 16a in the right column. Opening 16*a* in the left column and opening 16*a* in the right column have an identical shape, and opening 16*a* in the middle column is smaller than opening 16*a* in the left column and opening 16*a* in the right column. Opening 16*a* in the middle column may be larger than opening 16*a* in the left column and opening 16*a* in the right column. The above configuration examples can be applied as the disposition of opening 16*a*.

FIGS. 22A, 22B and 22C are plan views schematically illustrating pixel electrode 15 and common electrode 16 of configuration example 17. In configuration example 17, openings 16*a* of common electrode 16 are configured with a plurality of groups having different sizes. In the example of FIG. 22B, opening 16*a* having a small width and opening 16*a* having a large width are alternately disposed in the column and row directions (into a matrix shape).

Figure 23A:
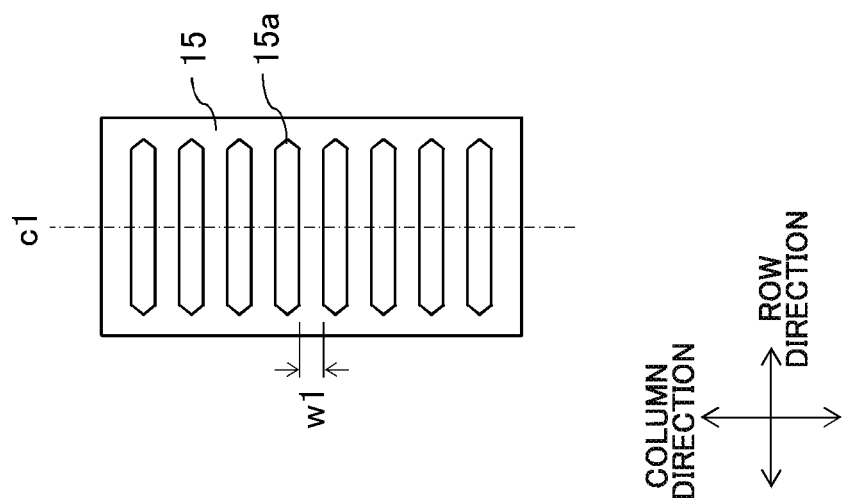
FIGS. 23A, 23B and 23C are plan views schematically illustrating pixel electrode and common electrode of configuration example 18.
Figure 23B:
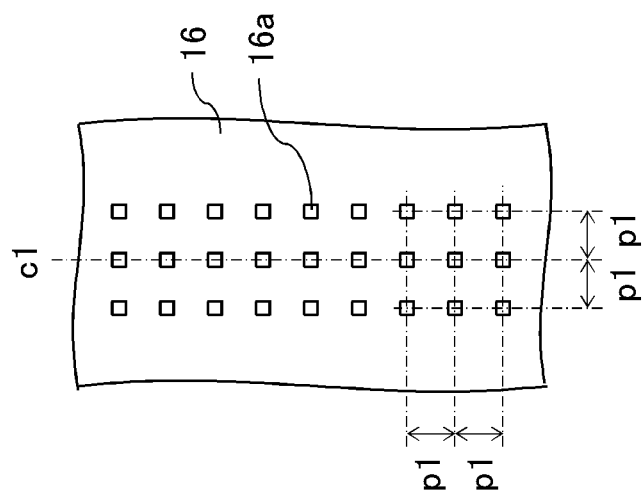
Figure 23C:
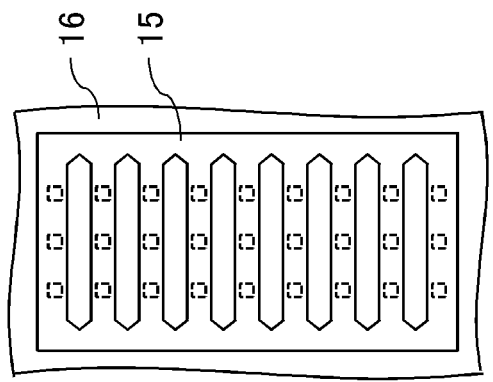

FIGS. 23A, 23B and 23C are plan views schematically illustrating pixel electrode 15 and common electrode 16 of configuration example 18. In configuration example 18, openings 16*a* of common electrode 16 are disposed at equal intervals p1 in the column and row directions (the matrix shape).

Figure 24A:
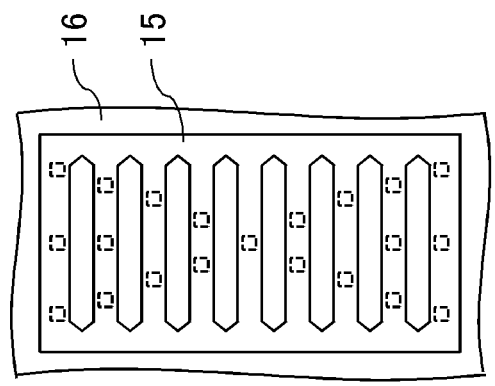
FIGS. 24A, 24B and 24C are plan views schematically illustrating pixel electrode and common electrode of configuration example 19.
Figure 24B:
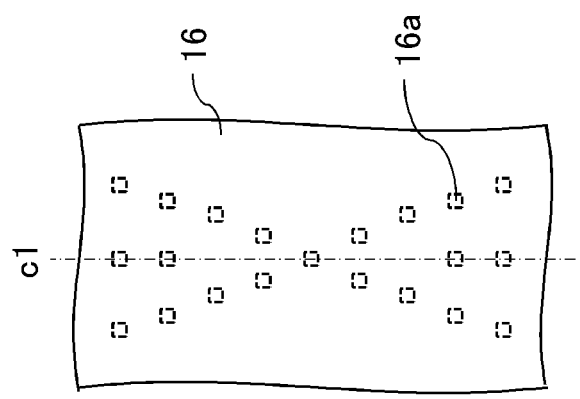
Figure 24C:
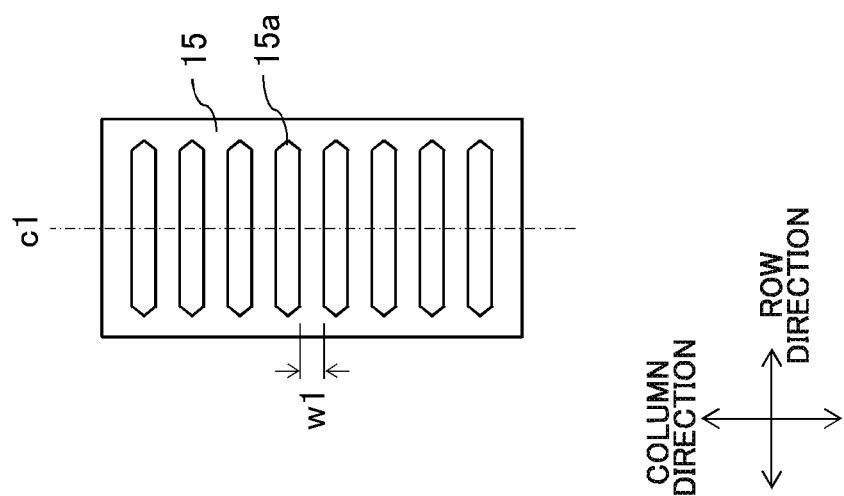

FIGS. 24A, 24B and 24C are plan views schematically illustrating pixel electrode 15 and common electrode 16 of configuration example 19. In configuration example 19, openings 16*a* of common electrode 16 are disposed such that the number of openings 16*a* decreases toward the center of the pixel region in one pixel 14 (a distribution density is low), and such that the number of openings 16*a* increases toward the end (the upper side and the lower side) of the pixel region (the distribution density is high).

FIGS. 25A, 25B and 25C are plan views schematically illustrating pixel electrode 15 and common electrode 16 of configuration example 20. In configuration example 20, openings 16*a* of common electrode 16 are disposed such that the number of openings 16*a* increases toward the center of the pixel region in one pixel 14 (the distribution density is high), and such that the number of openings 16*a* decreases toward the end (the upper side and the lower side) of the pixel region (the distribution density is low).

In the above configuration examples 7 to 20 (FIGS. 12A to 25C), opening 16*a* of common electrode 16 is formed into the square shape. Opening 16*a* of common electrode 16 of the exemplary embodiment is not limited to the square shape, but various shapes can be applied.

Figure 26A:
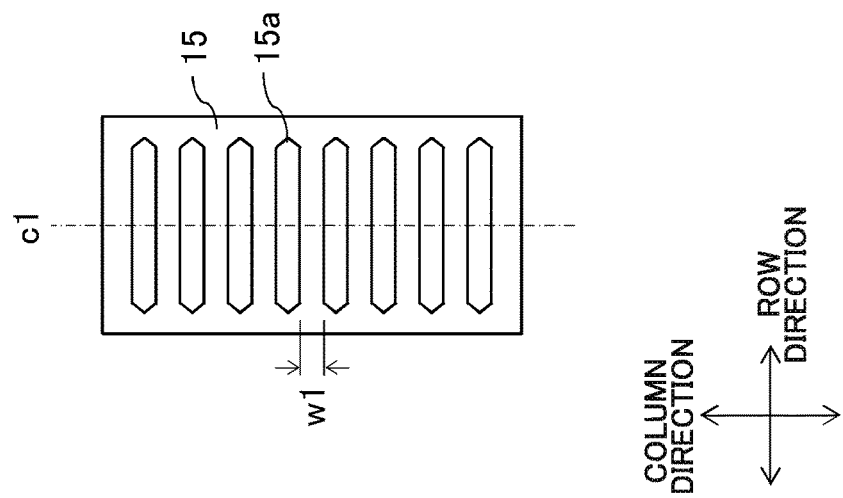
FIGS. 26A, 26B and 26C are plan views schematically illustrating pixel electrode and common electrode of configuration example 21.
Figure 26B:
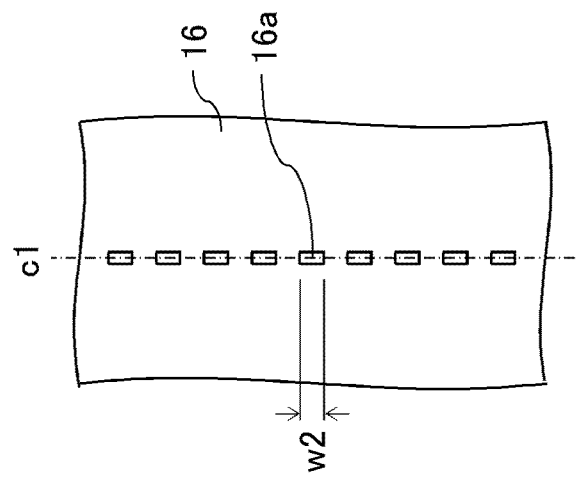
Figure 26C:
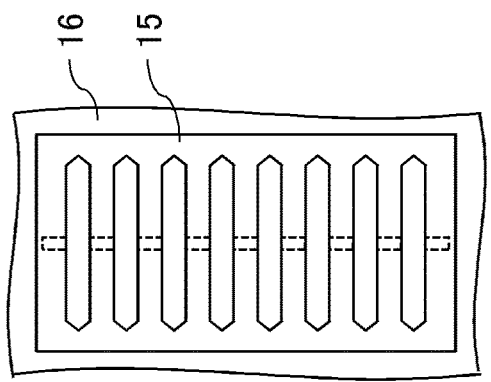

For example, as illustrated in FIG. 26B (configuration example 21), opening 16*a* may be formed into a (vertically-long) rectangular shape elongated in the column direction. As illustrated in FIG. 27B (configuration example 22), opening 16*a* may be formed into a triangular shape. Two side or three sides may have an identical length, or three sides may have different lengths. As illustrated in FIG. 28B (configuration example 23), opening 16*a* may be formed into a rhombic shape. There is no particular limitation to an angle of the rhomboid. As illustrated in FIG. 29B (configuration example 24), opening 16*a* may be formed into a pentagonal shape. Opening 16*a* is not limited to the pentagonal shape, but opening 16*a* may be formed into a polygonal shape such as a hexagonal shape. As illustrated in FIG. 30 (configuration example 25), opening 16*a* may be formed into a circular shape. Opening 16*a* is not limited to the circular shape, but opening 16*a* may be formed into an elliptical shape. Common electrode 16 may have a plurality of kinds of openings 16*a* having different shapes.

In FIGS. 26A to 30C, the size and disposition of opening 16*a* indicate the size and disposition corresponding to configuration example 7 (FIG. 12B). The size and disposition of opening 16*a* in configuration examples 21 to 25 are not limited to the configuration in FIGS. 26A to 30C, but the configuration of configuration examples 8 to 20 (FIGS. 13A to 25C) can be applied to the size and disposition of opening 16*a* in configuration examples 21 to 25.

In configuration examples 7 to 25 (FIGS. 12A to 30C), opening 16*a* of common electrode 16 is disposed so as to overlap with the electrode portion of pixel electrode 15 in planar view. In the exemplary embodiment, the disposition of opening 16*a* of common electrode 16 is not limited to configuration examples 7 to 25. For example, opening 16*a* of common electrode 16 is disposed so as to fall within opening 15*a* of pixel electrode 15 in planar view. That is, the whole of opening region of opening 16*a* may be disposed so as to overlap with opening 15*a* in planar view.

FIGS. 31A, 31B and 31C are plan views schematically illustrating pixel electrode 15 and common electrode 16 of configuration example 26. In configuration example 26, width w1 in the column direction of opening 15*a* is substantially equal to width w2 in the column direction of opening 16*a* (w1≈w2), and the center line of the width in the column direction of opening 15*a* is matched with the center line of the width in the column direction of opening 16*a*. Opening 16*a* is disposed so as to fall within opening 15*a* in planar view.

FIGS. 32A, 32B and 32C are plan views schematically illustrating pixel electrode 15 and common electrode 16 of configuration example 27. In configuration example 27, width w2 in the column direction of opening 16*a* is smaller than width w1 in the column direction of opening 15*a* (w1>w2), and the center line of the width in the column direction of opening 15*a* is matched with the center line of the width in the column direction of opening 16*a*. Opening 16*a* is disposed so as to fall within opening 15*a* in planar view.

FIGS. 33A, 33B and 33C are plan views schematically illustrating pixel electrode 15 and common electrode 16 of configuration example 28. In configuration example 28, width w2 in the column direction of opening 16*a* is smaller than width w1 in the column direction of opening 15*a* (w1>w2), and center line c2 of the width in the column direction of opening 15*a* deviates from center line c3 of the width in the column direction of opening 16*a*. Opening 16*a* is disposed so as to deviate upward in opening 15*a* in planar view. Opening 16*a* may be disposed so as to deviate downward in opening 15*a* in planar view.

FIGS. 34A, 34B and 34C are plan views schematically illustrating pixel electrode 15 and common electrode 16 of configuration example 29. In configuration example 29, the plurality of openings 16*a* arranged in the column direction deviate alternately to the upper side and lower side of opening 15*a* in planar view.

FIGS. 35A, 35B and 35C are plan views schematically illustrating pixel electrode 15 and common electrode 16 of configuration example 30. In configuration example 30, the plurality of openings 16*a* of common electrode 16 are formed in the row direction. In FIG. 35, two openings 16*a* are formed in the row direction. Alternatively, at least three openings 16*a* may be formed in the row direction. Openings 16*a* are formed so as to be symmetric with respect to center line c1 in the row direction of pixel 14. The configurations of configuration examples 26 to 29 can be applied as the size and disposition of opening 16*a*.

FIGS. 36A, 36B and 36C are plan views schematically illustrating pixel electrode 15 and common electrode 16 of configuration example 31. In configuration example 31, openings 16*a* of common electrode 16 are configured with the plurality of groups having different sizes. Openings 16a of each group are disposed so as to fall within opening 15a in planar view.

In the exemplary embodiment, the shape of opening 16a of common electrode 16 is not limited to the above configuration examples. For example, opening 16a may be formed into a rectangular shape extending in the column direction so as to stride over the plurality of openings 15a of pixel electrode 15.

Figure 37C:
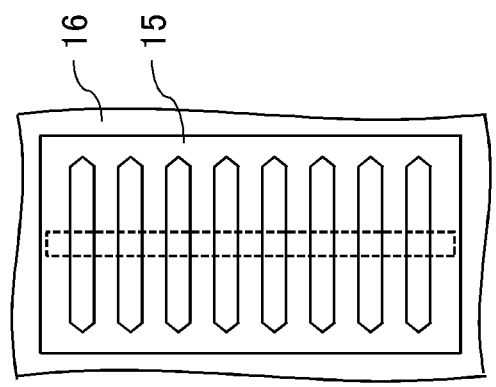
FIGS. 37A, 37B and 37C are plan views schematically illustrating pixel electrode and common electrode of configuration example 32.
Figure 37B:
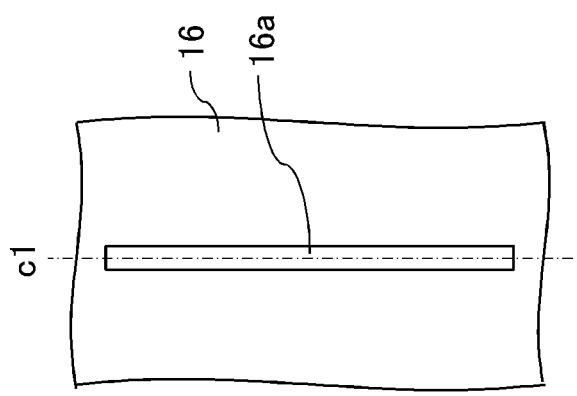
Figure 37A:
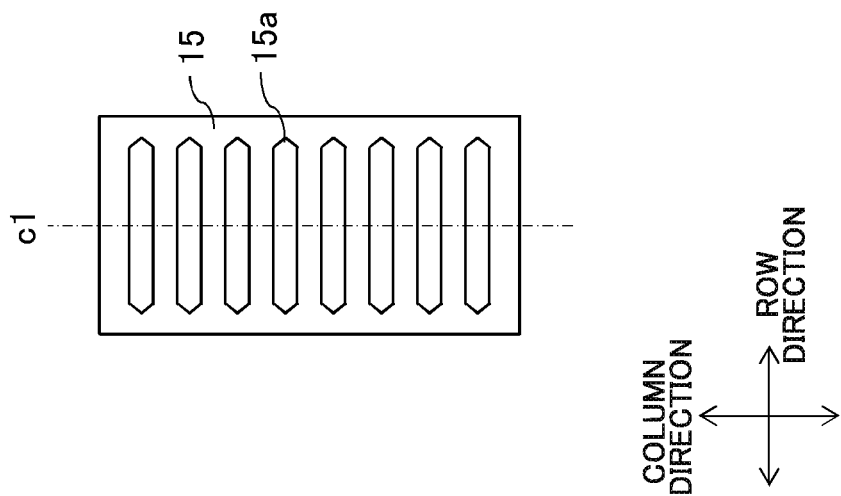

FIGS. 37A, 37B and 37C are plan views schematically illustrating pixel electrode 15 and common electrode 16 of configuration example 32. In configuration example 32, openings 16a are formed so as to be symmetric with respect to center c1 in the row direction of pixel 14, and openings 16a extend in the column direction so as to stride over the plurality of openings 15a of pixel electrode 15. Opening 16a is disposed so as to overlap with opening 15a and the electrode portion of pixel electrode 15 in planar view.

Figure 38C:
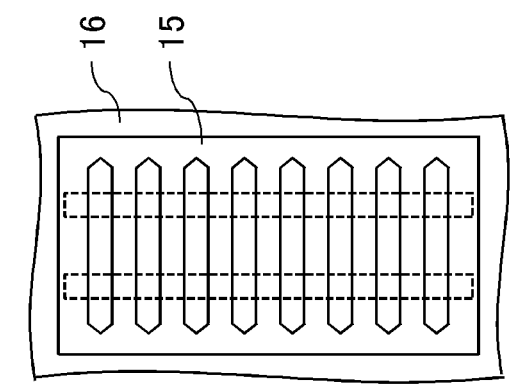
FIGS. 38A, 38B and 38C are plan views schematically illustrating pixel electrode and common electrode of configuration example 33.
Figure 38B:
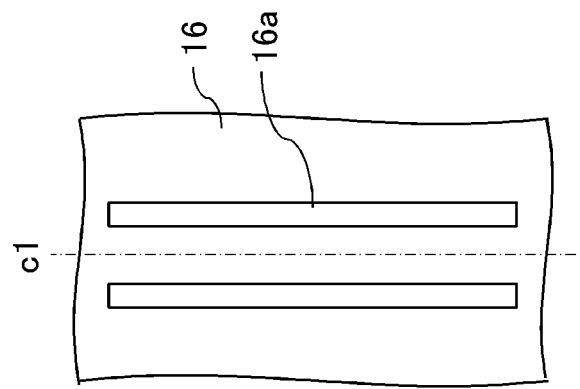
Figure 38A:
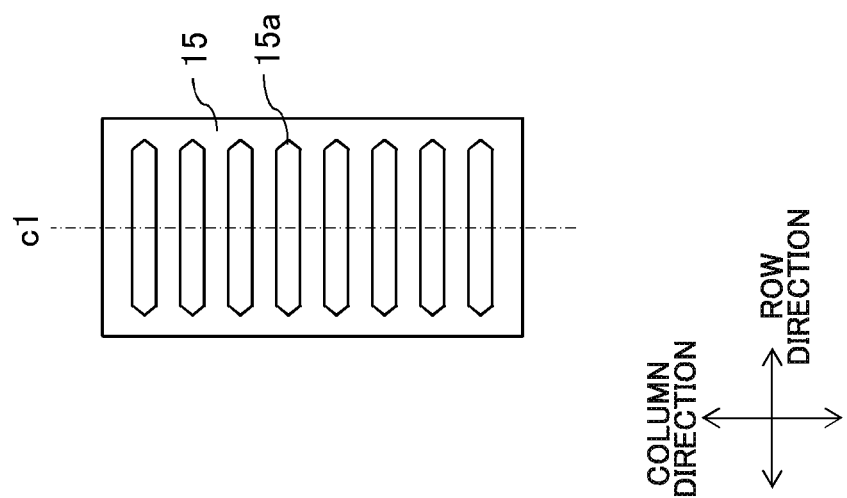

FIGS. 38A, 38B and 38C are plan views schematically illustrating pixel electrode 15 and common electrode 16 of configuration example 33. In configuration example 33, the plurality (in FIG. 38B two) of openings 16a are arranged in the row direction, and formed so as to be symmetric with respect to center c1 in the row direction of pixel 14.

Figure 39A:
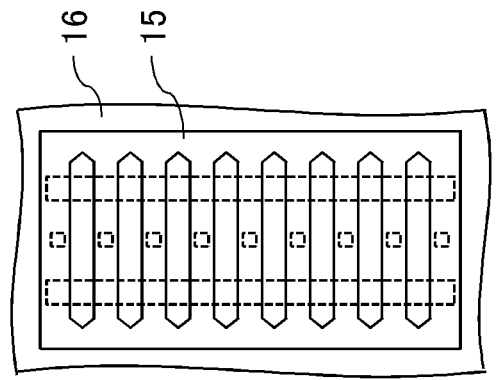
FIGS. 39A, 39B and 39C are plan views schematically illustrating pixel electrode and common electrode of configuration example 34.
Figure 39B:
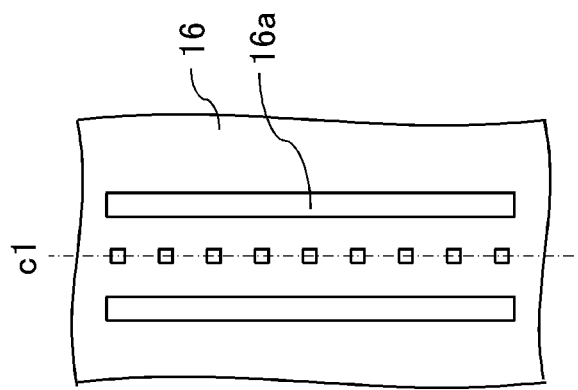
Figure 39C:
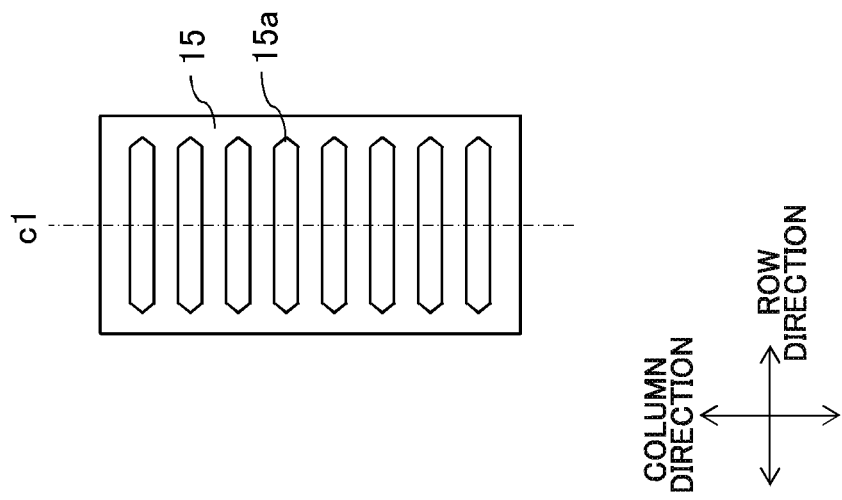

FIGS. 39A, 39B and 39C are plan views schematically illustrating pixel electrode 15 and common electrode 16 of configuration example 34. In configuration example 34, two openings 16a that extend in the column direction so as to stride over the plurality of openings 15a of pixel electrode 15 and the plurality of square openings 16a, which are arranged in the column direction and are smaller than the width of the electrode portion of pixel electrode 15, are formed so as to be symmetric with respect to center c1 in the row direction of pixel 14.

In the above configuration examples 1 to 34 (FIGS. 6A to 39C), opening 15a of pixel electrode 15 is formed into the horizontally-long polygonal shape, the long sides of plural sides constituting opening 15a extend in the row direction, and the short sides of the plural sides extend in the column direction. In the exemplary embodiment, the shape of opening 15a of pixel electrode 15 is not limited to configuration examples 1 to 34. For example, as illustrated in FIG. 40A (configuration example 35), opening 15a of pixel electrode 15 is formed into the vertically-long polygonal shape, the long sides of four sides constituting opening 15a extend in the column direction, and the short sides of plural sides extend in the row direction. In this case, for example, openings 16a of common electrode 16 are formed into a square shape, and arranged in the row and column directions. Opening 16a may be disposed so as to overlap with the electrode portion of pixel electrode 15 (see FIG. 40C), or disposed so as to overlap with opening 15a of pixel electrode 15. The configuration of each of the above configuration examples can be applied as the size and disposition of opening 16a in configuration example 35. As illustrated in FIGS. 41A to 41D, pixel electrode 15 may be formed into a comb teeth shape.

Figure 42:
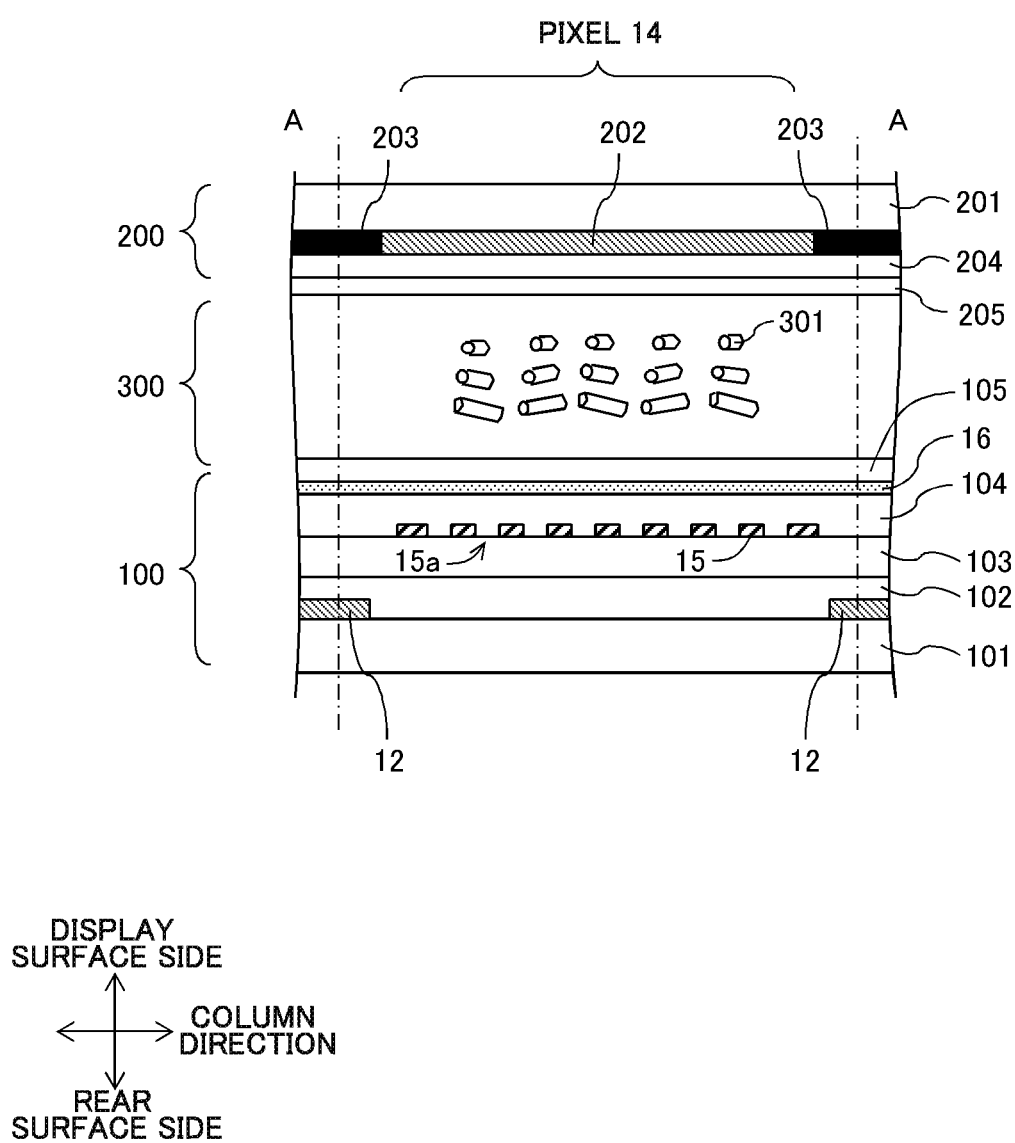
FIG. 42 is a cross section view illustrating another schematic configuration of a liquid crystal display device.

In the above configuration examples 1 to 35 (FIGS. 6A to 40C), pixel electrode 15 is disposed above common electrode 16. However, liquid crystal display device 1 of the exemplary embodiment is not limited to configuration examples 1 to 35. For example, as illustrated in FIG. 42, pixel electrode 15 may be disposed below common electrode 16. The shape and disposition of opening 15a in each of the above configuration examples may be applied to common electrode 16, and the shape and disposition of opening 16a may be applied to pixel electrode 15. That is, opening 15a of pixel electrode 15 and opening 16a of common electrode 16 may be replaced with each other.

Figure 44:
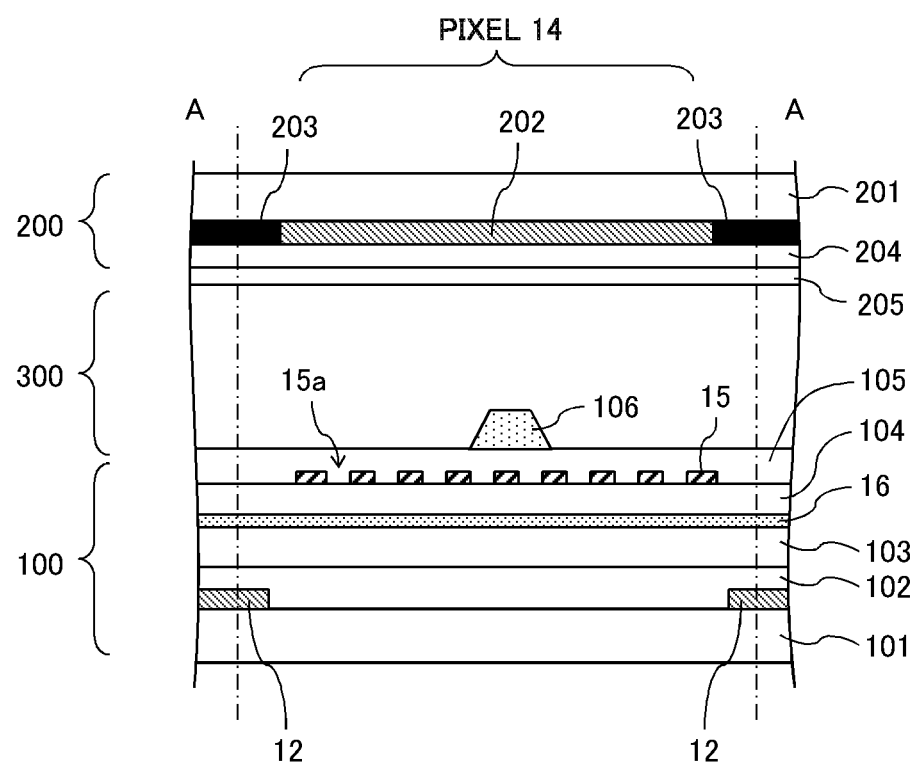
FIG. 44 is a cross section view illustrating another schematic configuration of a liquid crystal display device.

In liquid crystal display device 1 of the exemplary embodiment, as illustrated in FIG. 43, projection 206 that controls the alignment of liquid crystal 301 may be formed on the side of liquid crystal layer 300 of CF substrate 200. As illustrated in FIG. 44, projection 106 may be formed on the side of liquid crystal layer 300 of TFT substrate 100. Projections 106, 206 may be formed in both the substrates. There is no limitation to the shape of projections 106, 206 and the number of projections per pixel.

Figure 45:
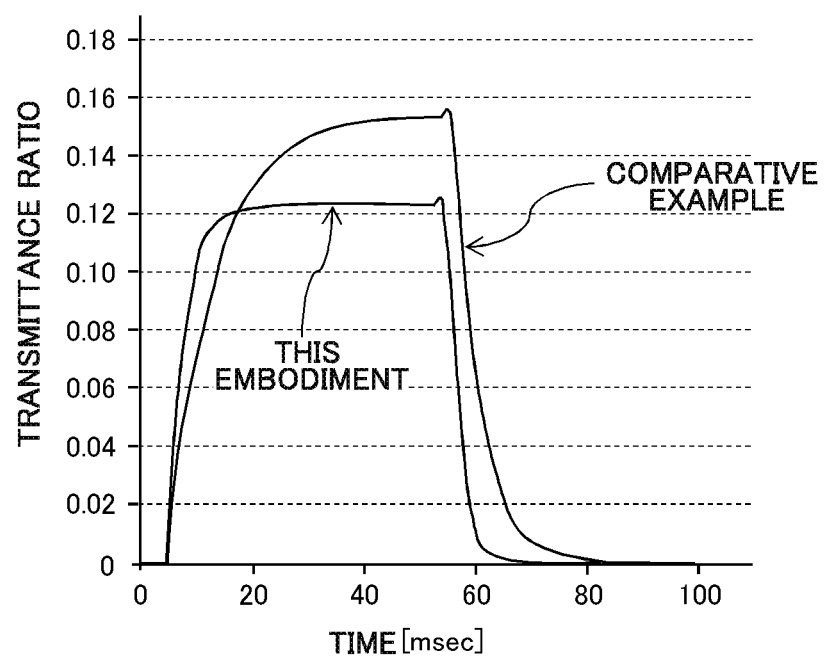
FIG. 45 is a graph illustrating simulations of the response characteristics.

According to the electrode structure of liquid crystal display device 1 of the exemplary embodiment, initial alignment of liquid crystal becomes a direction substantially parallel or perpendicular to the sides of openings 15a, 16a. A plurality of domains having a small size are formed in each pixel. Therefore, the response speed of the liquid crystal can be improved compared with the conventional lateral electric field system liquid crystal display device. FIG. 45 is a graph illustrating simulations of the response characteristics in a lateral electric field system liquid crystal display device of a comparative example and lateral electric field system liquid crystal display device 1 of the exemplary embodiment. As can be seen from FIG. 45, according to the configuration of liquid crystal display device 1 of the exemplary embodiment, changes in rise and fall become steep, and the response speed becomes high. That is, the viewing angle characteristic and the response speed can be improved in lateral electric field system liquid crystal display device of the exemplary embodiment.

The above configuration examples can be combined with each other as appropriate, and combined with a known configuration. While there have been described what are at present considered to be certain embodiments of the application, it will be understood that various modifications may be made thereto, and it is intended that the appended claims cover all such modifications as fall within the true spirit and scope of the invention.

What is claimed is:
1. A liquid crystal display device comprising:
  a first substrate including a first display electrode and a second display electrode that is disposed opposite the first display electrode with an insulator interposed between the first display electrode and the second display electrode;
  a second substrate disposed opposite the first substrate; and
  a liquid crystal layer disposed between the first substrate and the second substrate,
  wherein the first display electrode includes a plurality of first openings in each pixel,
  in each of the plurality of first openings an interior angle of at least one apex constituting the first opening is different from interior angle of another apex, and
  the interior angle of at least three apexes constituting the first opening and on a same end of the opening are more than 90 degrees and less than 180 degrees.
2. The liquid crystal display device according to claim 1, wherein the second display electrode includes a plurality of second openings,
  the plurality of first openings include a third opening and a fourth opening,
  the fourth opening is adjacent to the third opening in a long direction of the pixel, and
  one of the plurality of second openings overlaps with the third opening and the fourth opening.

3. The liquid crystal display device according to claim 1, wherein the second display electrode includes a plurality of second openings, and
   a whole opening region in each of the plurality of second openings overlaps with each of the plurality of first openings in planar view.

4. The liquid crystal display device according to claim 1, wherein the second display electrode includes a plurality of second openings, and
   the plurality of second openings are arranged in a direction orthogonal to a long direction of the first opening.

5. The liquid crystal display device according to claim 4, wherein the plurality of second openings are arranged in a long direction of the first opening.

6. The liquid crystal display device according to claim 1, wherein the second display electrode includes a plurality of second openings, and in each of the plurality of second openings, a width in a first direction that is of a direction in which the plurality of first openings are arranged is equal to a width in the first direction of an electrode portion between the two first openings adjacent to each other or a width in the first direction of the first opening.

7. The liquid crystal display device according to claim 1, wherein the second display electrode includes a plurality of second openings, and
   each of the plurality of second openings is formed into one of a square shape, a rectangular shape, a triangular shape, a rhombic shape, a polygonal shape, a circular shape, and an elliptic shape.

8. The liquid crystal display device according to claim 1, wherein at least one of the first substrate and the second substrate includes a projection that controls alignment of liquid crystal.

9. The liquid crystal display device according to claim 1, wherein the interior angles of all apexes constituting the first opening are more than 90 degrees and less than 180 degrees.

10. The liquid crystal display device according to claim 1, wherein each of the plurality of first openings is symmetric with respect to a center of a short side of the pixel.

11. A liquid crystal display device comprising:
   a first substrate including a first display electrode and a second display electrode that is disposed opposite the first display electrode with an insulator interposed between the first display electrode and the second display electrode;
   a second substrate disposed opposite the first substrate; and
   a liquid crystal layer disposed between the first substrate and the second substrate,
   wherein the first display electrode includes a plurality of first openings in each pixel,
   in each of the plurality of first openings an interior angle of at least one apex constituting the first opening is different from interior angle of another apex,
   the second display electrode includes a plurality of second openings,
   one of the plurality of second openings overlaps with a straight portion of an edge of one of the plurality of first openings in planar view, and
   the straight portion is parallel to a short direction of the pixel.

12. The liquid crystal display device according to claim 11, wherein each of the plurality of second openings overlaps with a straight portion of the edge of each of the plurality of first openings in planar view.

13. The liquid crystal display device according to claim 11, wherein the plurality of first openings are disposed in parallel to each other,
   the plurality of first openings are disposed such that a long direction of the first opening is parallel to the short direction of the pixel, and
   at least two of the plurality of second openings are disposed along the long direction of the first opening.

14. A liquid crystal display device comprising:
   a first substrate including a first display electrode and a second display electrode that is disposed opposite the first display electrode with an insulator interposed between the first display electrode and the second display electrode;
   a second substrate disposed opposite the first substrate; and
   a liquid crystal layer disposed between the first substrate and the second substrate,
   wherein the first display electrode includes a plurality of first openings in each pixel,
   in each of the plurality of first openings an interior angle of at least one apex constituting the first opening is different from interior angle of another apex,
   the second display electrode includes a plurality of second openings,
   one of the plurality of second openings does not overlap with each of the plurality of first openings in planar view, and the interior angles of at least three apexes constituting the first opening and on a same end of the opening are more than 90 degrees and less than 180 degrees.

15. The liquid crystal display device according to claim 14, wherein each of the plurality of second openings does not overlap with each of the plurality of first openings in planar view.

16. The liquid crystal display device according to claim 14, wherein the plurality of first openings are disposed in parallel to each other,
   the plurality of first openings are disposed such that a long direction of the first opening is parallel to a short direction of the pixel,
   the plurality of second openings include a fifth opening and a sixth opening, and
   the fifth opening and the sixth opening are disposed along the long direction of the first opening.

17. The liquid crystal display device according to claim 16, wherein the plurality of first openings include a seventh opening and an eighth opening,
   the seventh opening is adjacent to the eighth opening in a long direction of the pixel, and
   the fifth opening and the sixth opening are disposed between the seventh opening and the eighth opening in planar view.

18. The liquid crystal display device according to claim 16, wherein the fifth opening is larger than the sixth opening.

19. The liquid crystal display device according to claim 17, wherein a centerline divides the first electrode in half in the short direction of the pixel,
   the fifth opening is deviated away from the centerline, and disposed toward the seventh opening, and
   the sixth opening is deviated away from the centerline, and disposed toward the seventh opening.

20. The liquid crystal display device according to claim 17, wherein a centerline divides the first electrode in half in the short direction of the pixel,
   the fifth opening is deviated away from the centerline, and disposed toward the seventh opening, and the sixth opening is deviated away from the centerline, and disposed toward the eighth opening.

* * * * *